US010286410B2

(12) United States Patent
Petit

(10) Patent No.: US 10,286,410 B2
(45) Date of Patent: *May 14, 2019

(54) VEHICLE WASH SYSTEMS AND METHODS

(71) Applicant: PETIT AUTO WASH, INC., Norton, OH (US)

(72) Inventor: Thomas J. Petit, Wadsworth, OH (US)

(73) Assignee: PETIT AUTO WASH, INC., Norton, OH (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/389,602

(22) Filed: Dec. 23, 2016

(65) Prior Publication Data

US 2017/0100729 A1    Apr. 13, 2017

Related U.S. Application Data

(60) Continuation of application No. 13/833,254, filed on Mar. 15, 2013, now Pat. No. 9,533,315, which is a
(Continued)

(51) Int. Cl.
*B05B 3/14* (2006.01)
*B60S 3/04* (2006.01)
(Continued)

(52) U.S. Cl.
CPC ............... *B05B 3/14* (2013.01); *B08B 3/024* (2013.01); *B60S 3/04* (2013.01); *B05B 15/80* (2018.02); *B60S 3/002* (2013.01); *G01B 11/04* (2013.01)

(58) Field of Classification Search
CPC . B60S 3/04; B60S 3/002; G01B 11/04; B05B 15/1203; B05B 3/14; B08B 3/024
(Continued)

(56) References Cited

U.S. PATENT DOCUMENTS 2,722,453 A * 11/1955 Moore ................. A01M 7/0053
239/160
4,052,006 A * 10/1977 Grass .................. A01M 7/0075
239/161
(Continued)

FOREIGN PATENT DOCUMENTS

| JP | 2890240 B2 | 5/1999 |
| JP | 2000-142332 A | 5/2000 |

(Continued)

OTHER PUBLICATIONS

International Search Report/Written Opinion for corresponding PCT International Application No. PCT/US2009/042462 dated Dec. 30, 2009.

*Primary Examiner* — Joseph L. Perrin
*Assistant Examiner* — Kevin G Lee
(74) *Attorney, Agent, or Firm* — Hahn Loeser + Parks LLP; Scott M. Oldham, Esq.

(57) ABSTRACT

The invention is directed at systems and methods which provide for effective cleaning and drying of vehicles of different shapes and sizes. The invention in one example includes a vehicle washing apparatus comprising a conveyor system to move a vehicle along a path, and a bridge assembly supported above a vehicle and moveable along the length thereof. At least one trolley assembly is operatively supported by the bridge assembly and is moveable in a direction generally transverse to the movement of the bridge assembly. At least one cleaning arm assembly for delivering cleaning fluid to or for brushing the surface of a vehicle is operatively supported by the at least one trolley assembly or bridge. The cleaning arm assembly is moveable with the bridge assembly along the length of the vehicle, and transversely with the at least one trolley assembly to adjust the location of the cleaning arm relative to the vehicle, wherein the bridge assembly moves in association with movement of
(Continued)

the vehicle to position the cleaning arm assembly adjacent at least a portion of the front, sides and rear of the vehicle as it moves along the path. A variable impact or patterning spray arm or drying system is also provided.

20 Claims, 25 Drawing Sheets

Related U.S. Application Data division of application No. 12/414,109, filed on Mar. 30, 2009, now Pat. No. 8,813,765.

(60) Provisional application No. 61/049,519, filed on May 1, 2008.

(51) Int. Cl.
*B08B 3/02* (2006.01)
*B60S 3/00* (2006.01)
*G01B 11/04* (2006.01)
*B05B 15/80* (2018.01)

(58) Field of Classification Search
USPC ......... 239/229, 227, 269, 323, 588; 134/123
See application file for complete search history.

(56) References Cited

U.S. PATENT DOCUMENTS

| | | |
|---|---|---|
| 4,057,866 A | 11/1977 | Belanger |
| D247,437 S | 3/1978 | Nelson |
| 4,424,602 A | 1/1984 | Belanger et al. |
| 4,527,578 A | 7/1985 | Klein et al. |
| 4,530,126 A | 7/1985 | Belanger |
| 4,685,166 A | 8/1987 | Belanger |
| 4,685,169 A | 8/1987 | Nelson |
| 4,716,916 A | 1/1988 | Hodge |
| 4,719,932 A | 1/1988 | Burton |
| RE32,601 E | 2/1988 | Klein et al. |
| D298,373 S | 11/1988 | Nelson |
| 4,857,113 A | 8/1989 | Hodge |
| 4,933,016 A | 6/1990 | Carlson |
| RE33,334 E | 9/1990 | Nelson |
| 4,998,547 A | 3/1991 | Klein |
| 5,167,044 A | 12/1992 | Belanger et al. |
| 5,226,436 A | 7/1993 | Kirby |
| 5,279,013 A | 1/1994 | Krichbaum |
| 5,325,559 A | 7/1994 | Belanger et al. |
| 5,482,212 A * | 1/1996 | Kobryn ................ B60S 3/04 239/227 |
| 5,526,983 A | 6/1996 | Petit |
| 5,613,260 A | 3/1997 | Belanger et al. |
| 5,813,076 A | 9/1998 | Belanger et al. |
| 5,883,816 A | 3/1999 | Dollhopf et al. |
| 5,924,156 A | 7/1999 | Belanger et al. |
| 6,021,556 A | 2/2000 | Belanger et al. |
| 6,372,053 B1 | 4/2002 | Belanger et al. |
| 6,381,503 B1 | 4/2002 | Dollhopf et al. |
| 6,718,216 B2 | 4/2004 | Grier |
| 7,337,791 B1 | 3/2008 | Belanger et al. |
| RE40,463 E | 8/2008 | Belanger et al. |
| 7,438,075 B1 | 10/2008 | Huntington et al. |
| 2002/0162581 A1 | 11/2002 | Heinze et al. |
| 2004/0064908 A1 | 4/2004 | Decker |
| 2004/0065752 A1* | 4/2004 | Mather ............... B05B 13/0405 239/261 |
| 2004/0149316 A1 | 8/2004 | Fratello |

FOREIGN PATENT DOCUMENTS

| | | |
|---|---|---|
| KR | 10-0343440 B1 | 7/2002 |
| WO | 2009/135095 | 11/2009 |

* cited by examiner

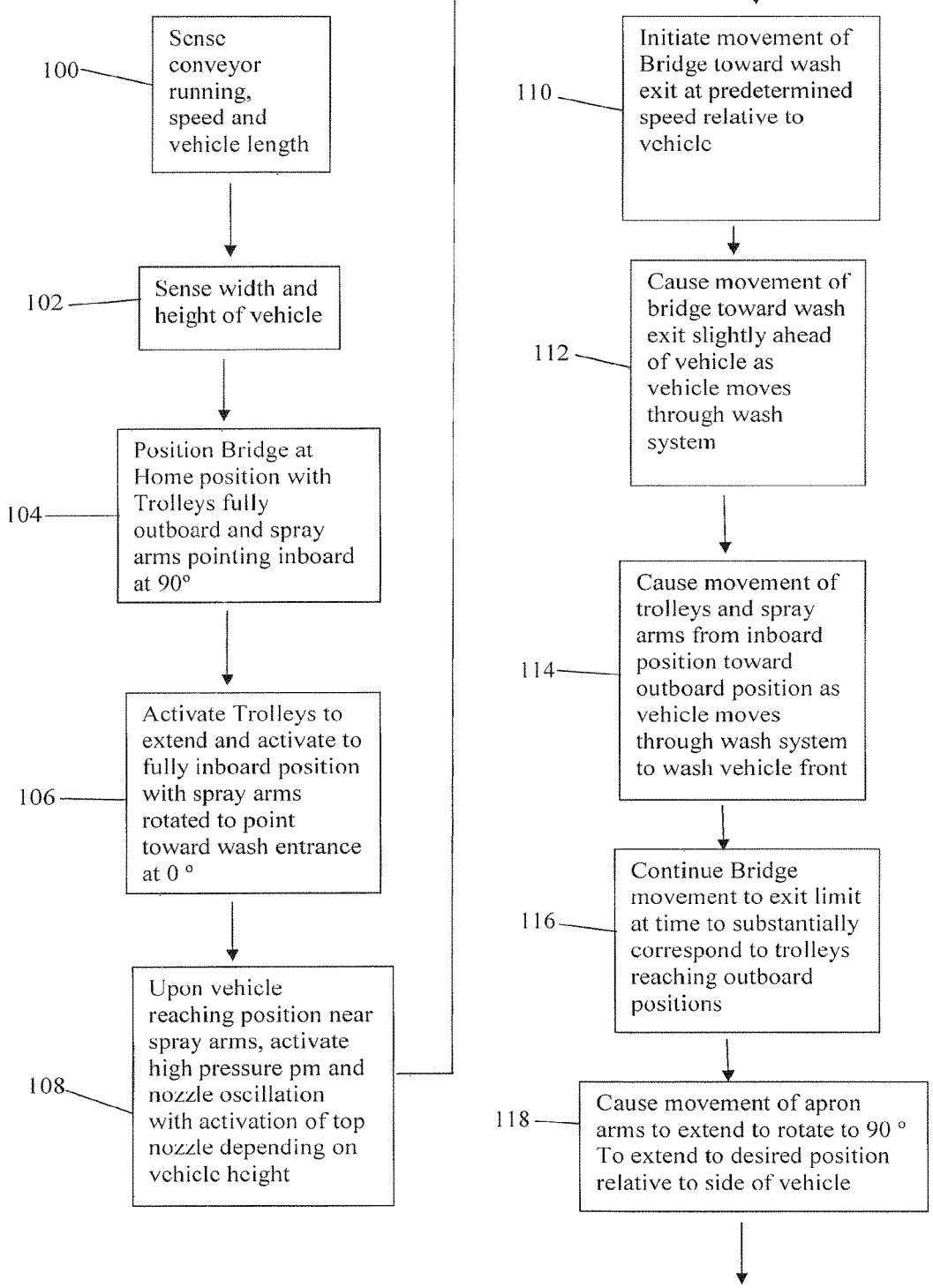

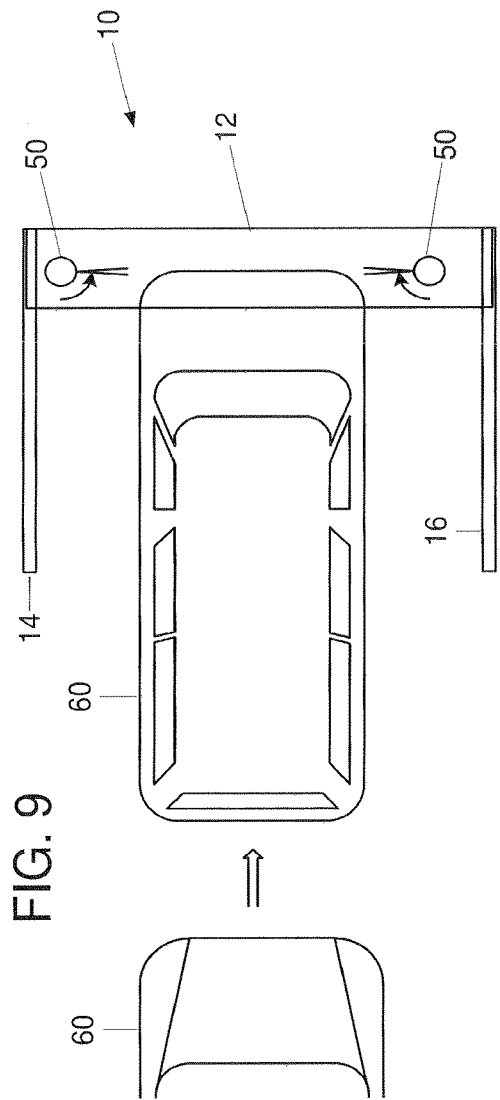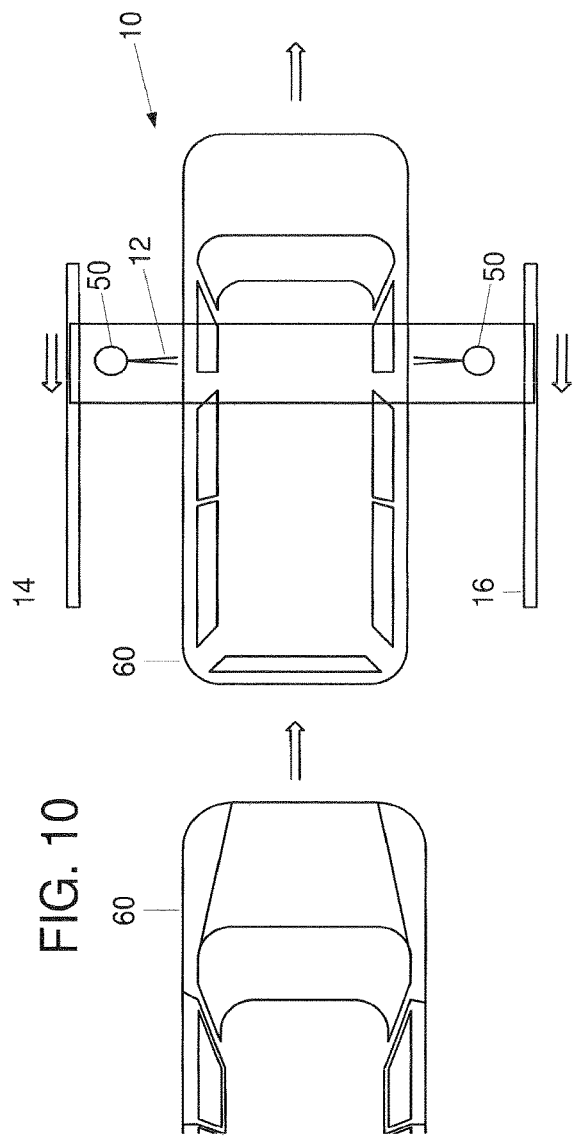

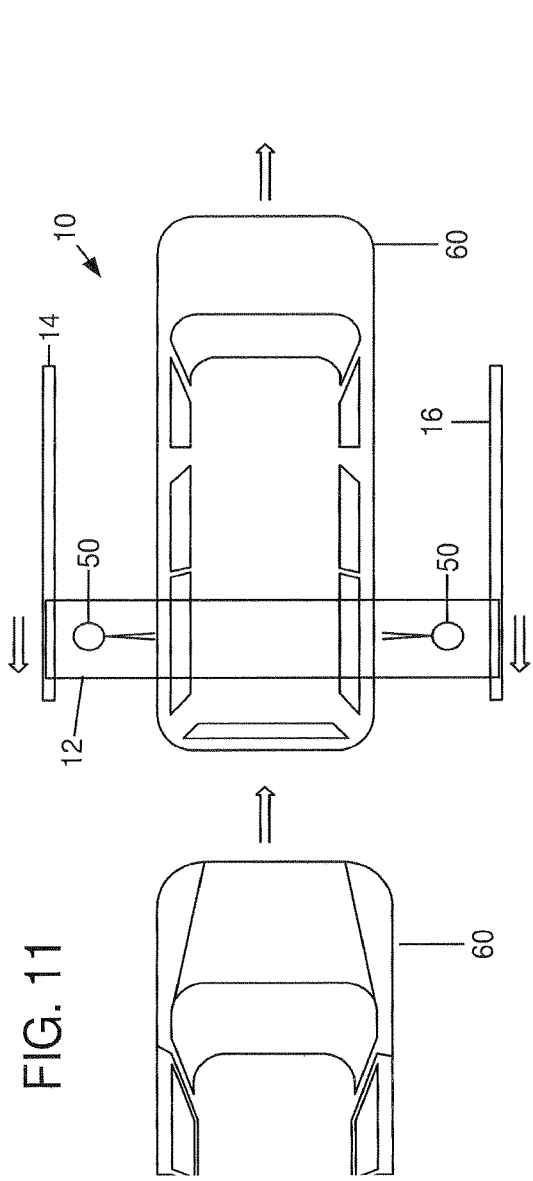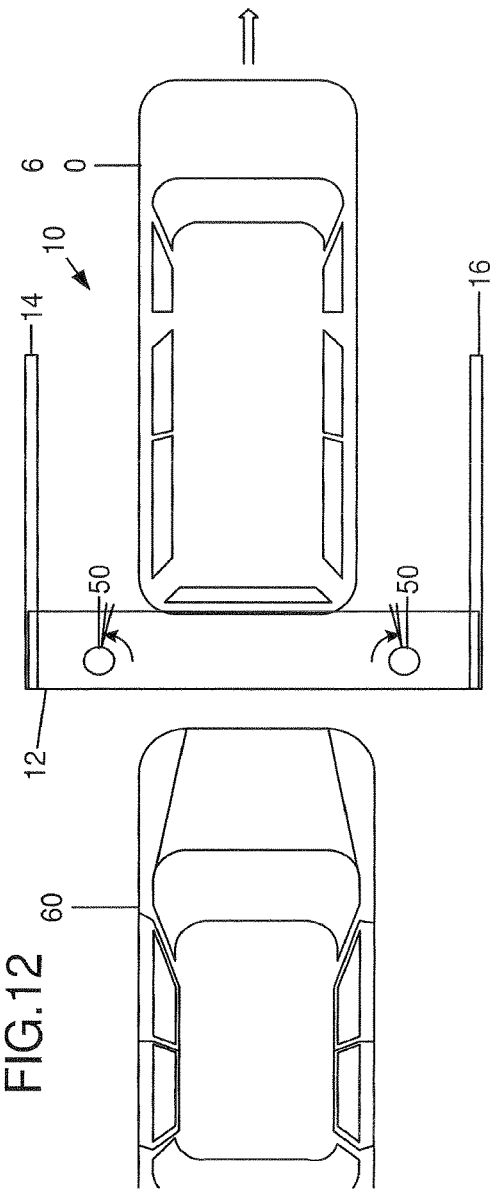

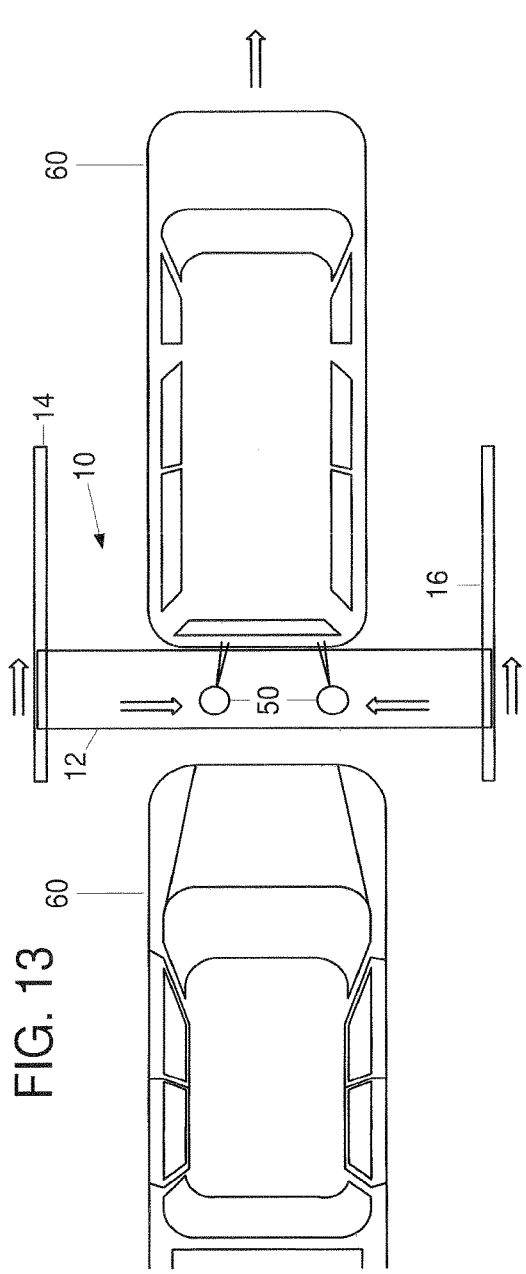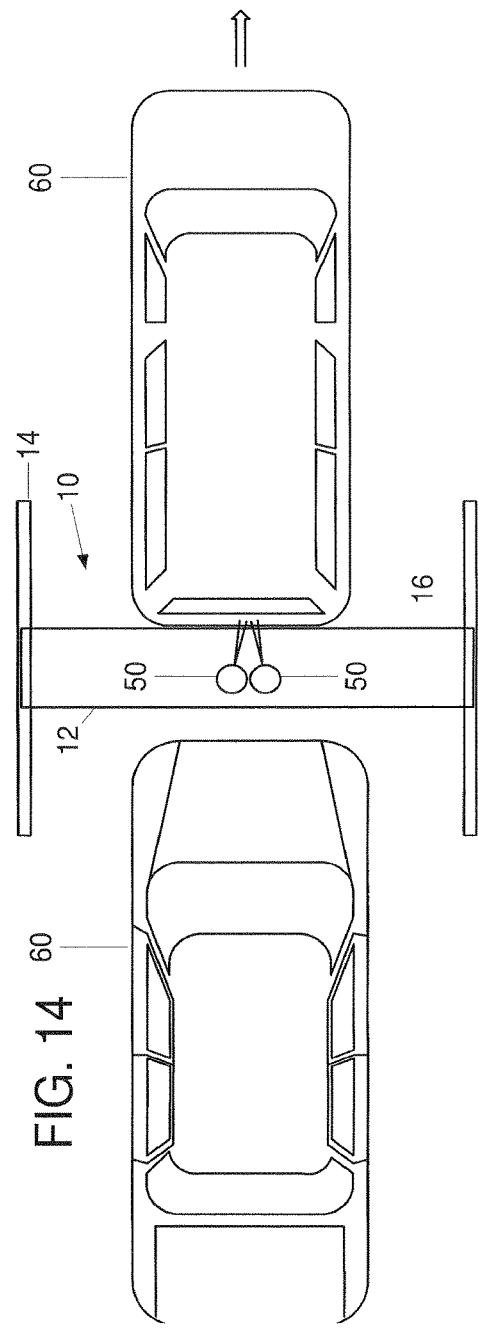

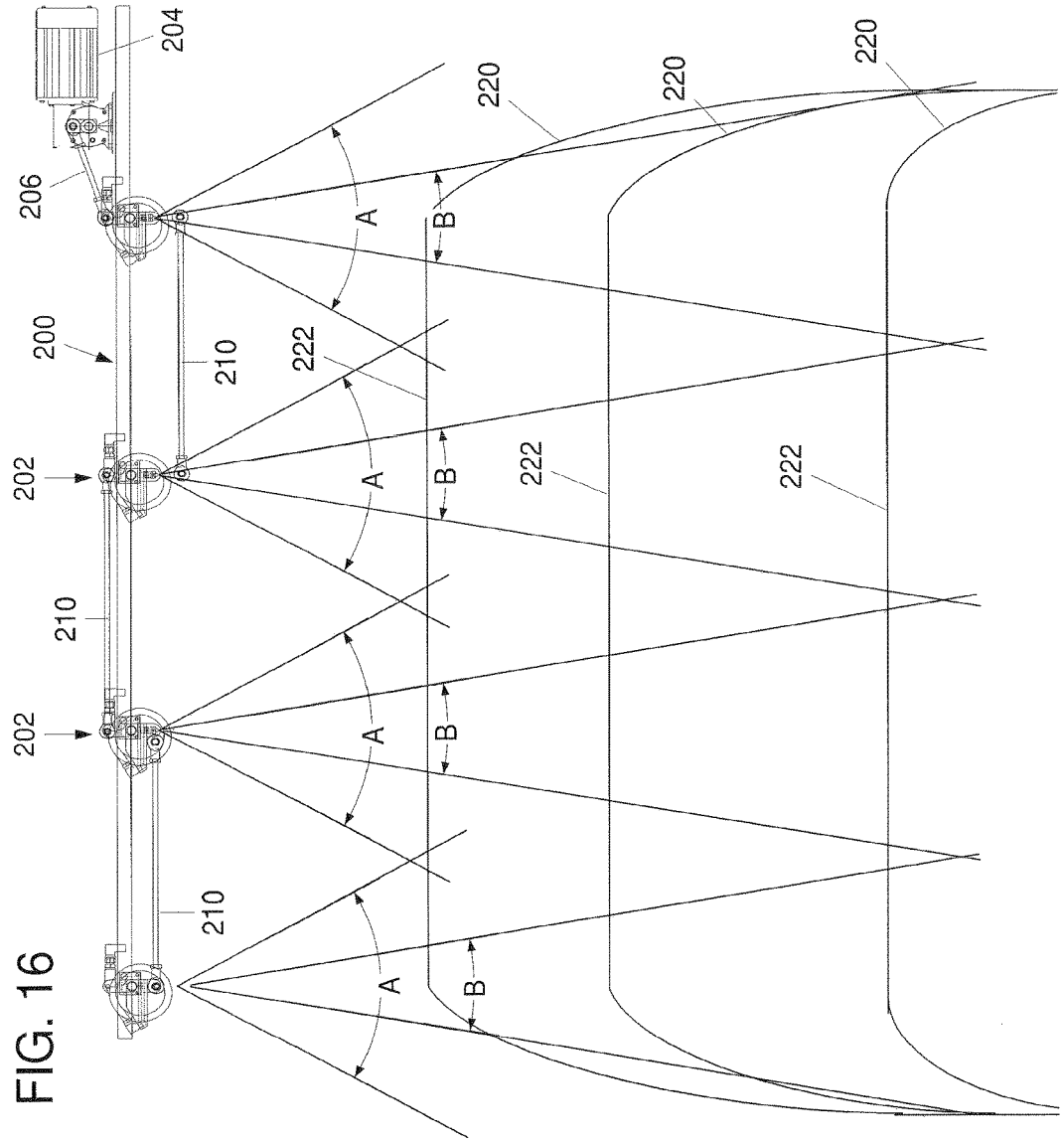

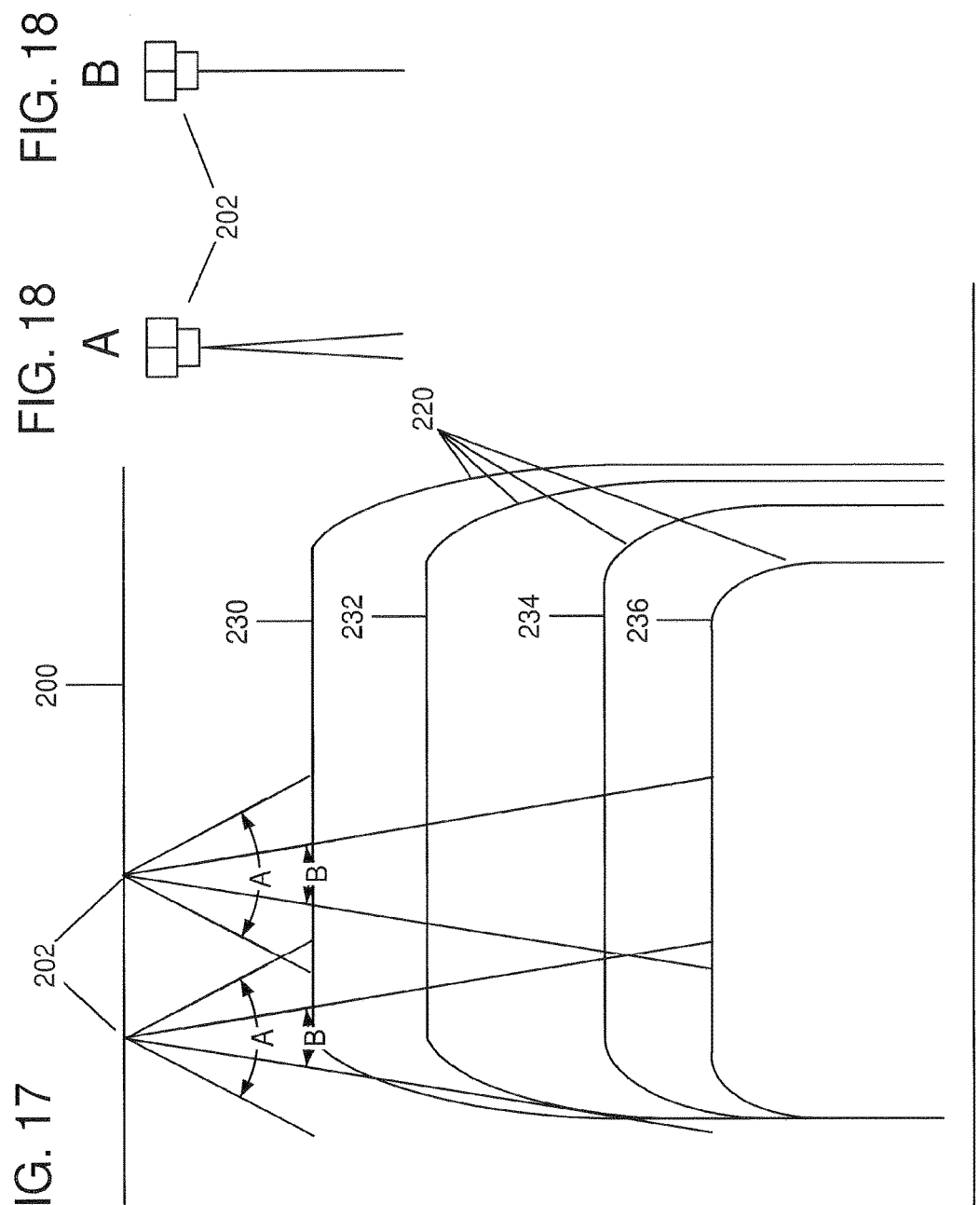

FIG. 19
FIG. 20
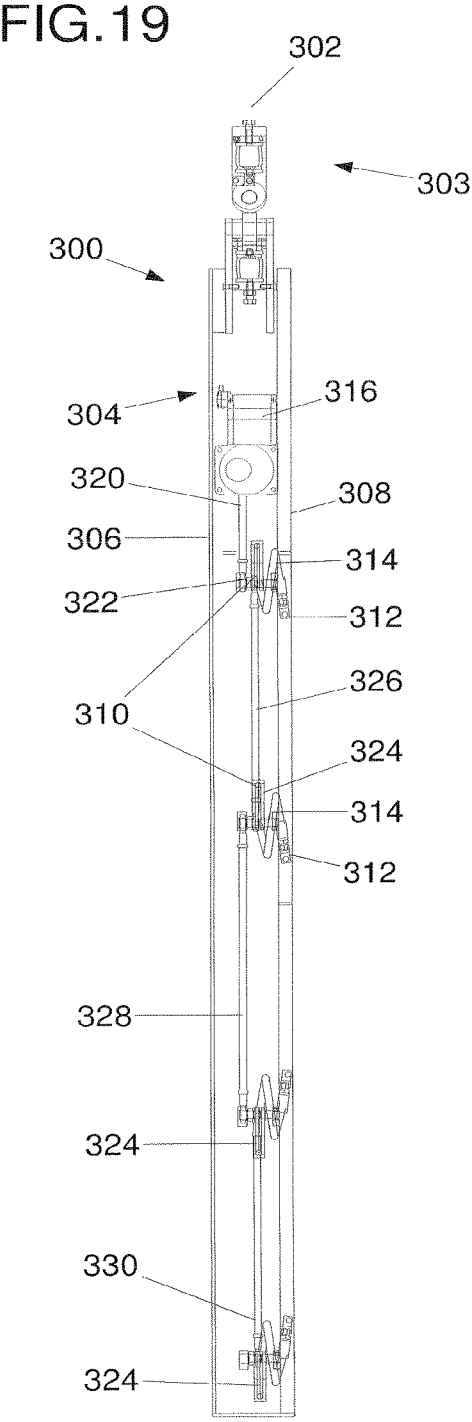
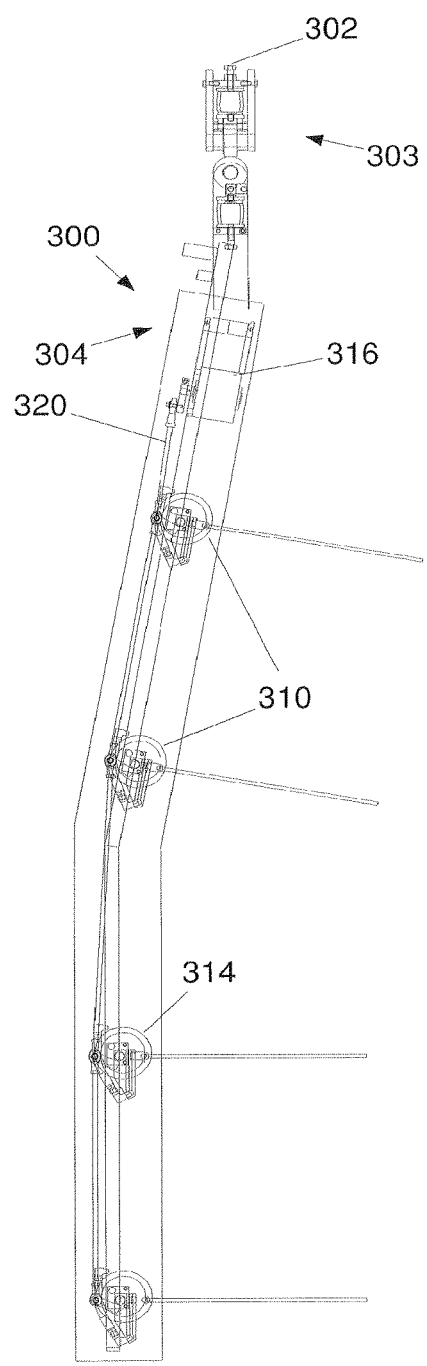

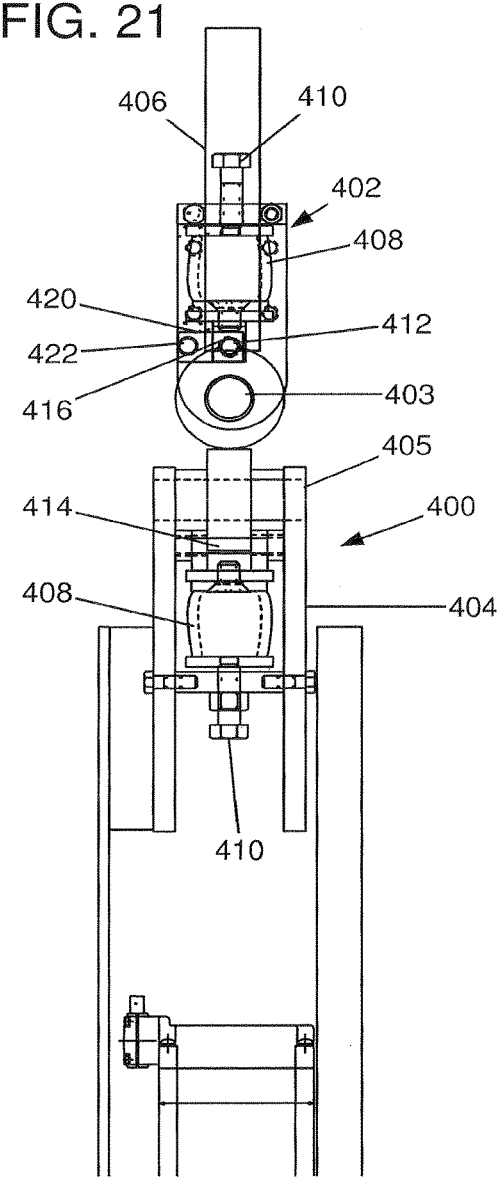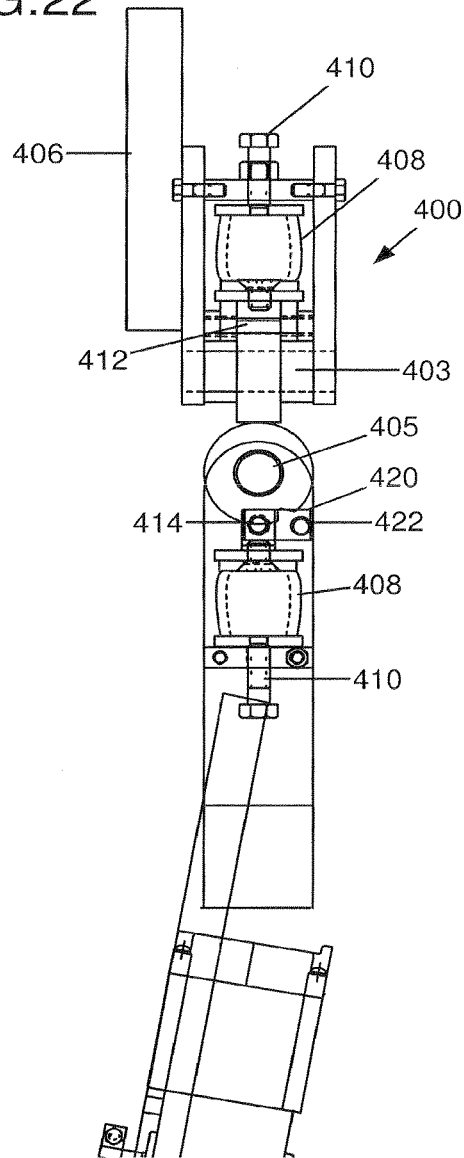

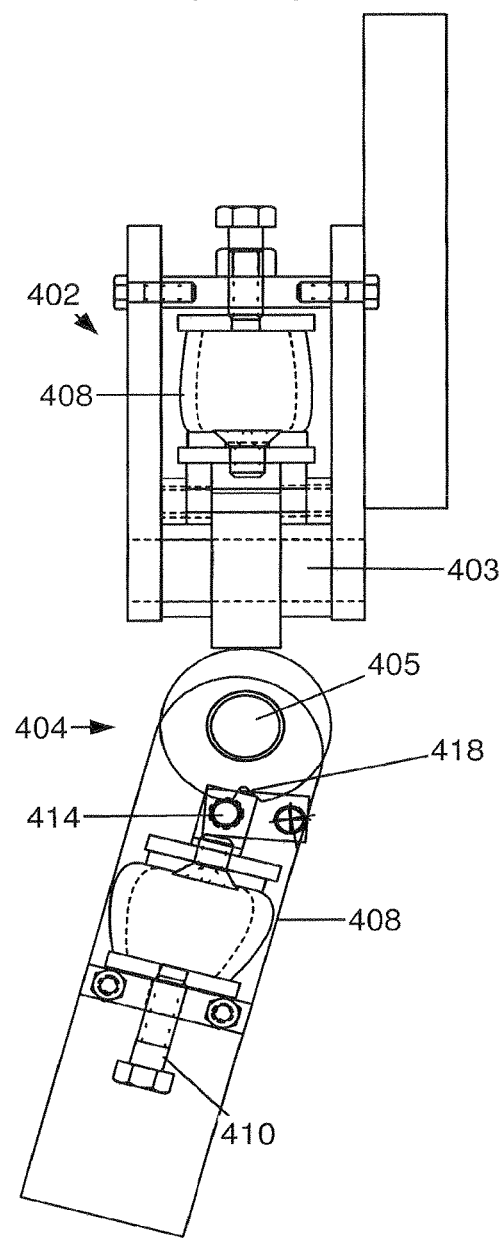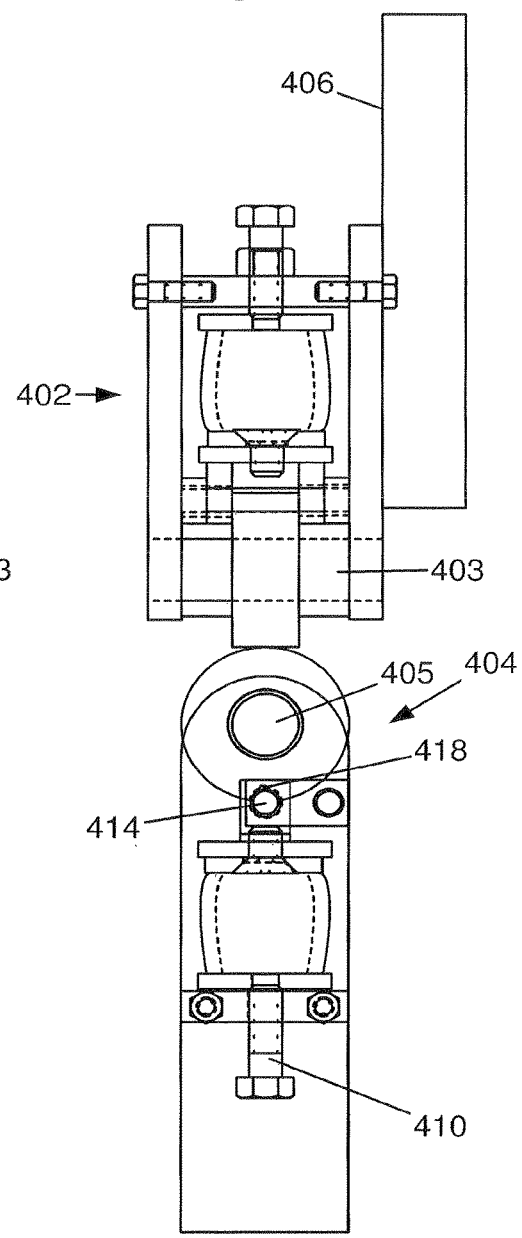

VEHICLE WASH SYSTEMS AND METHODS

CROSS REFERENCE TO RELATED APPLICATION

This application is a continuation of co-pending U.S. application Ser. No. 13/833,254 filed Mar. 15, 2013, which claims the benefit of U.S. application Ser. No. 12/414,109 filed Mar. 30, 2009, which in turn claims the benefit of U.S. Provisional Application No. 61/049,519 filed on May 1, 2008, all of which are hereby incorporated herein by reference.

BACKGROUND AND SUMMARY OF THE DISCLOSURE

The present invention is generally directed to automated vehicle wash systems and, more particularly, to a vehicle wash system having features enabling it to occupy a small footprint, if desired. The present invention relates, generally, to a vehicle wash apparatus and, more specifically, to a vehicle wash apparatus having a pair of spray arms adapted to move about the surface of the vehicle at an optimum cleaning distance over all the surfaces of the vehicle.

Motor vehicles are washed and cleaned in order to preserve and extend the life of the vehicle finish and maintain its appearance. Automatic drive-through wash facilities that provide this service are well known for the non-commercial vehicle owner. For example, traditional tunnel, conveyor-type wash facilities are common in this industry and typically employ an array of equipment that sequentially treats the vehicle with various operations as it passes through the facility. While these systems have generally worked for their intended purpose, the traditional tunnel systems occupy a considerable amount of space and often require a considerable amount of maintenance to keep the associated series of wash mechanisms operational. Further, the traditional tunnel systems generally consume sizable amounts of water and wash chemicals, and employ brushes and other friction-based systems to clean the exterior surfaces of the vehicle.

In addition to the tunnel systems, small bay wash systems are also employed. These systems provide space-savings over the tunnel conveyor systems. Accordingly, they may be employed in a variety of locations where space is at a premium, such as a single garage size bay in a gas station or at a convenience store. Additionally, the small bay wash systems generally provide directed nozzles or movable spray arms that deliver pressurized water and chemicals to the surface of the vehicle. Given these advantages, the use of small bay wash systems has been growing.

Wash systems are also employed in commercial environments for use with large numbers of vehicles for example. For example, commercial systems may have substantially more area in which to wash a vehicle compared to residential or non-commercial systems and, accordingly, may employ relatively complicated cleaning mechanisms. In such commercial systems, the vehicle may be moved through or parked in a building, such as a garage-like enclosure, as various cleaning processes are performed. The cleaning stations may take various forms including, for example, a pre-soak station, a soap application station, side and overhead brush stations, a rinse station, a liquid polish application station, and a drying station. Although such systems provide good cleaning of vehicles, the complexity and costs associated with operating such systems can be significant, and it would be desirable to have a system which is simpler and yet provides good cleaning characteristics in a more cost-effective manner.

In the touch-free wash systems, the systems may apply high pressure liquid streams to wash the vehicle as the vehicle sits at a stationary location. The liquid streams may be applied to the vehicle in several different manners, depending on design constraints. For example, the liquid streams may be applied concurrently over the length of the vehicle by a stationary assembly. Alternatively, the liquid streams may be applied by an assembly that moves relative to the vehicle. These types of systems may be referred to as rollover type vehicle wash systems. Rollover wash systems are so named because they move a wash mechanism back and forth about (i.e. roll over) a stationary vehicle. Rollover wash systems confine the wash event to one relatively small area, which allows the water and chemicals to be applied more effectively and efficiently. A gantry-type system is one example of a rollover vehicle wash system. The gantry style rollover wash system includes a movable system in which the wash mechanisms are contained within a large rigid inverted "U"-shaped housing that surrounds the vehicle and rides back and forth in floor-mounted tracks. The width of the gantry system is generally not adjustable, and therefore limits the size of the vehicle that can be effectively washed and puts wider vehicles at risk for damage. Some gantry style systems are constructed having a wider structure to span wider vehicles, but with a wider structure, smaller vehicles are not as effectively cleaned. Additionally, the front and rear ends of the vehicle are generally difficult to clean and are not properly cleaned. In such systems, a series of vehicle positioning sensors may be used to determine the position of the vehicle to control operation of the spray mechanisms during the cleaning operation.

Although touch-free overhead gantry systems are somewhat effective at removing some dirt from a vehicle, the touch-free system does not generally provide desired cleaning characteristics, particularly at some locations on the vehicle. Accordingly, improvements in the design and efficiency of such washing systems are needed.

In addition to the moveable gantry style devices, it is also known to provide wash systems that employ a fixed or rigid frame. A rigid frame wash system has a wide stationary frame that spans the wash area and provides an overhead bridge assembly that moves along the frame over the vehicle. One or more spray arms may then be used to direct high pressure cleaning fluid toward the vehicle. The spray arm is moved in a controlled manner to clean a parked vehicle. The controlled movement of the spray arm requires a complex and expensive mechanical system, and is prone to breakdowns requiring regular repair and maintenance.

Thus, there remains a need for an improved vehicle wash system that provided effective cleaning of all vehicle surfaces in a cost-effective system.

SUMMARY

The invention is therefore directed at systems and methods which provide for effective cleaning of vehicles of different shapes and sizes in a cost-efficient system and methods which enhance cleaning processes. The invention in one example includes a vehicle washing apparatus comprising a conveyor system to move a vehicle along a path, and a bridge assembly supported above a vehicle and moveable rectilinearly along the length thereof. At least one trolley assembly is operatively supported by the bridge assembly and moveable in a direction generally transverse to the rectilinear movement of the bridge assembly. At least one cleaning arm assembly for delivering fluid to or for brushing the surface of a vehicle is operatively supported by the at least one trolley assembly. The at least one cleaning arm assembly including a upright portion with at least one spray nozzle or brush provided thereon, and the at least one cleaning arm assembly operatively supported for at least rotational movement relative to the at least one trolley assembly about an axis. The at least one cleaning arm assembly is moveable rectilinearly with the bridge assembly along the length of the vehicle, transversely with the at least one trolley assembly to adjust the location of said cleaning arm relative to the vehicle, and rotationally about the axis to allow the at least one cleaning arm assembly to circumscribe at least a portion of the vehicle. The bridge assembly moves in association with movement of the vehicle to position the at least one cleaning arm assembly adjacent at least a portion of the front, sides and rear of the vehicle as it moves along the path.

In another example, a vehicle wash system includes a bridge assembly adapted to be supported above a vehicle, and which may be moveable rectilinearly along the length thereof, and/or wherein the vehicle is moved rectilinearly through the bridge assembly. This wash apparatus further includes a pair of opposed trolley assemblies operatively supported by the bridge assembly and moveable toward and away from one another in a direction generally transverse to the rectilinear movement of the bridge assembly and/or vehicle. At least a pair of spray manifold assemblies are provided for delivering fluids to the vehicle with each manifold assembly operatively supported by a corresponding one of the opposed trolley assemblies. Each spray manifold assembly includes a generally vertical manifold portion operatively supported for rotational movement by a corresponding one of the pair of trolley assemblies about a generally vertical axis. Each of the pair of spray manifold assemblies are moveable rectilinearly with the bridge assembly along the length of the vehicle, and transversely with the respective one of the pair of trolley assemblies to adjust the location of the vertical manifold portion relative to the vehicle, and pivotally about the axis defined by the vertical manifold portion to allow the pair of spray manifold assemblies to move toward and away from one another and to circumscribe the vehicle.

In another example of the vehicle wash apparatus of the present invention, the bridge assembly includes a pair of trolley rails extending generally transverse to the direction of rectilinear movement of the bridge assembly. A pair of opposed trolley assemblies are operatively mounted to the pair of trolley rails and are independently moveable toward and away from one another in a direction generally transverse to the rectilinear movement of the bridge assembly. A pair of spray manifold assemblies are provided for delivering fluid to the vehicle with each manifold assembly having a generally vertical manifold portion operatively supported for rotational movement about an axis defined by the vertical manifold portion. Each of the pair of spray manifold assemblies are also rectilinearly moveable with the bridge assembly along the length of the vehicle, transversely and independently movable with the respective one of the pair of trolley assemblies toward and away from one another to adjust the location of the vertical manifold portions relative to the vehicle, and pivotally movable about the axis defined by the vertical manifold portion to circumscribe a portion of the vehicle.

In another example of the vehicle wash apparatus of the present invention, the pair of spray manifold assemblies includes a horizontal manifold portion, a vertical manifold portion operatively supported for rotational movement by the bridge assembly about an axis defined by the vertical manifold portion, and an intermediate spray manifold portion disposed at a predetermined angle relative to and extending between the horizontal and vertical manifold portions. Each of the pair of spray manifold assemblies are rectilinearly moveable with the bridge assembly along the length of the vehicle, transversely moveable to adjust the location of the pair of spray manifold assemblies relative to the vehicle, and pivotally movable about the axis defined by the vertical manifold portion to circumscribe the vehicle.

In an example of a method according to the invention, there is set forth a method of operating a vehicle washing apparatus comprising moving a vehicle along a path, and providing a washing apparatus along the path. The washing apparatus comprises a bridge assembly supported above a vehicle and moveable rectilinearly along the length thereof, a pair of opposed trolley assemblies operatively supported by the bridge assembly and moveable toward and away from one another in a direction generally transverse to the rectilinear movement of the bridge assembly, and a pair of spray arm assemblies for delivering fluid to the vehicle. Each one of the pair of spray arm assemblies is operatively supported by a corresponding one of the opposed trolley assemblies, and moveable to circumscribe the vehicle. The bridge assembly is moved in association with movement of the vehicle to position the spray arm assemblies adjacent the front, sides and rear of the vehicle as it moves along the path.

The invention also relates to a spray system comprising at least one spray bar having at least one spray nozzle thereon. The spray system is selectively variable to adjust the spray characteristics of the at least one spray nozzle in a manner selected from the group consisting of varying the impact or force of cleaning fluids impacting on a surface, the spray geometry from the at least one spray nozzle or combinations thereof.

In a further aspect, the invention relates to a spray system comprising at least one spray bar having at least one oscillating spray nozzle thereon. The spray system includes a frame on which the at least one spray nozzle is pivotably mounted and controlled to oscillate over a predetermined angle. A fluid manifold is provided for supplying fluid to the at least one nozzle, wherein the nozzle is coupled to the fluid manifold by a hose member through inlet and outlet fittings. The hose member has a minimum bend radius and is formed into a predetermined loop between the inlet and outlet fittings, such that upon oscillation of the at least one spray nozzle over the predetermined angle, the hose member flexes between the fittings without exceeding the minimum bend radius at any point during the oscillating motion of the at least one nozzle.

Other systems, methods, features and advantages of the invention will be, or will become, apparent to one with skill in the art upon examination of the following figures and description. It is intended that all such additional systems, methods, features and advantages be included within this description, be within the scope of the invention, and be protected by the following claims.

BRIEF DESCRIPTION OF THE DRAWINGS

Examples of embodiments of an automatic wash system and methods will be described with reference to the following figures:

FIG. 9 is a partial schematic top view showing an intermediate stage of operation of the wash system according to an example;

FIG. 10 is a partial schematic top view showing an intermediate stage of operation of the wash system according to an example;

FIG. 11 is a partial schematic top view showing an intermediate stage of operation of the wash system according to an example;

FIG. 12 is a partial schematic top view showing an intermediate stage of operation of the wash system according to an example;

FIG. 13 is a partial schematic top view showing an intermediate stage of operation of the wash system according to an example;

FIG. 14 is a partial schematic top view showing an intermediate stage of operation of the wash system according to an example;

FIG. 16 is a schematic end view of a spray system to provide variable impact and/or geometry washing characteristics;

FIG. 17 is a further schematic end view of a spray system as shown in FIG. 16 for use with different sized vehicles;

FIGS. 18a and 18b show a type of nozzle usable in a system such as shown in FIG. 16;

FIG. 19 is a diagrammatical front view of a spray system usable in a wash system according to the present disclosure; and FIG. 20 is a diagrammatical side view of the spray system shown in FIG. 19.

FIG. 21 is a partial front view of a breakaway system associated with a spray arm according to an example.

FIG. 22 is a partial side view of the breakaway system shown in FIG. 21.

FIGS. 23 and 24 show partial front views of the breakaway system showing an actuated lower assembly and unactuated assemblies.

DESCRIPTION OF THE DRAWINGS

Figure 1:
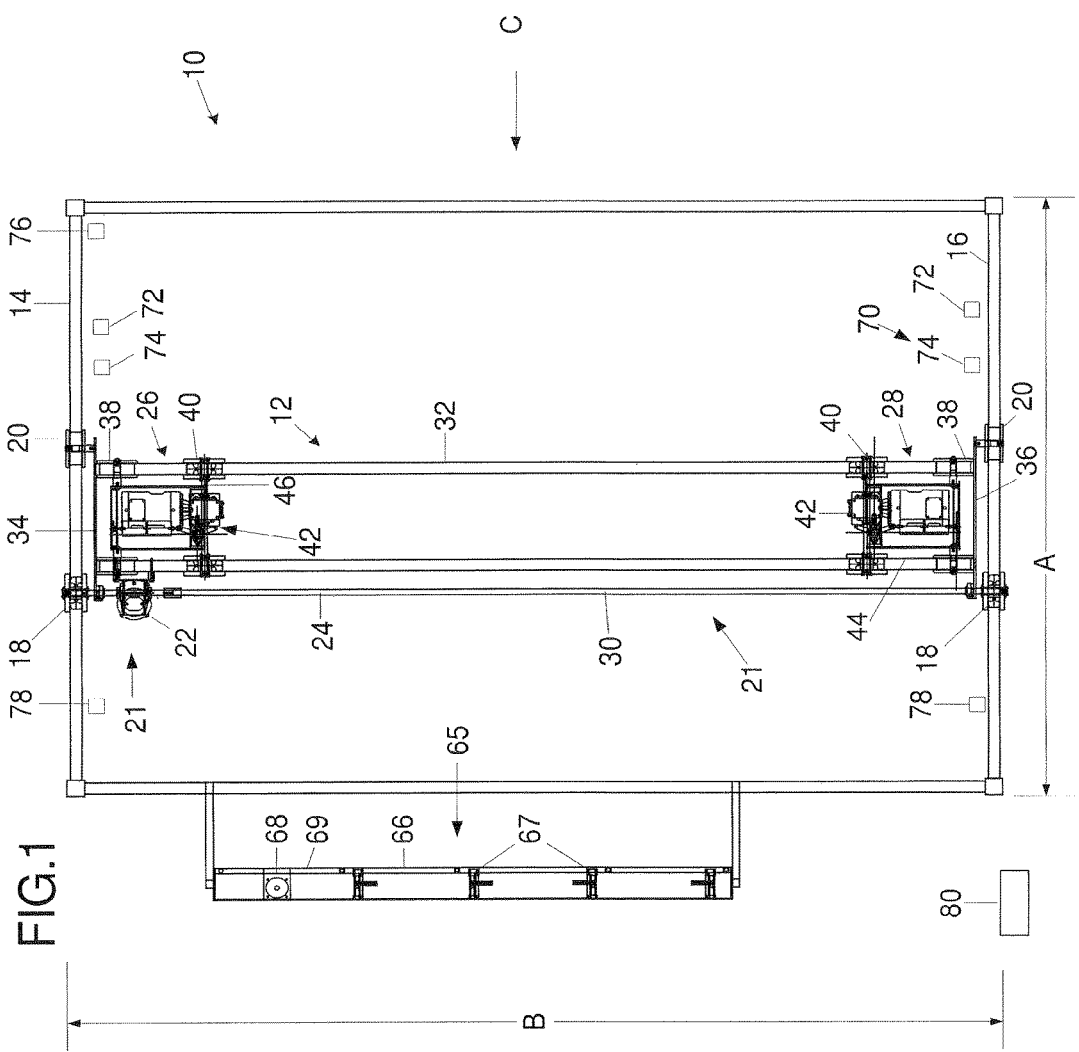
FIG. 1 is a top schematic view of a wash system and bridge and trolley assembly of an example according to the present disclosure.
Figure 2:
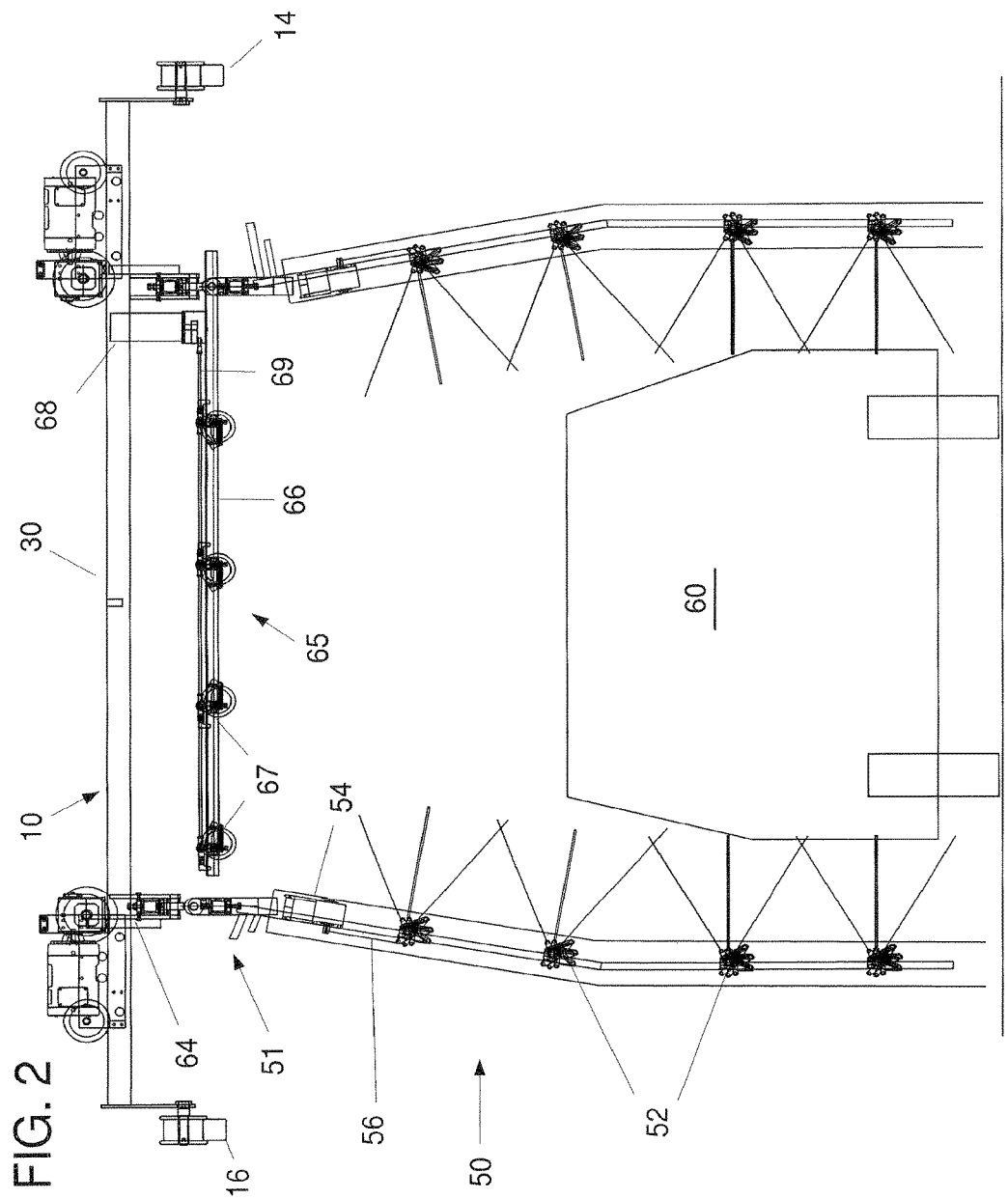
FIG. 2 is an end view of the wash system according to an example as shown in FIG. 1.

Turning to FIGS. 1 and 2, a vehicle wash apparatus according to a first example of the present invention is generally indicated at 10. The vehicle wash apparatus 10 is of a type that can be used in association with a vehicle conveyor, wherein the vehicle is moved along a path at a predetermined speed and for a predetermined distance. Alternatively, the apparatus 10 may be configured to be a rollover type system having a bridge assembly adapted to be supported above a vehicle and moveable rectilinearly along the length thereof. In either configuration, the vehicle wash apparatus 10 includes an overhead bridge assembly generally indicated at 12. As shown in FIGS. 1 and 2, a pair of spaced longitudinal bridge rails 14 and 16 are provided that support the bridge assembly 12. The bridge rails 14 and 16 are of a predetermined length A to allow the bridge assembly 12 to travel a predetermined distance during a cleaning operation as will be described in more detail hereafter.

The bridge rails 14 and 16 may be supported on a rigid frame assembly (not shown), suspended from a ceiling or other structure (not shown), or in any other suitable manner. The supporting structure for the bridge assembly 12 may take on a variety of forms. For example, the structure to support the bridge assembly 12 may be an enclosed housing, or simply a number of rigid members that form a structural framework. The bridge rails 14 and 16 are generally parallel to one another and may be spaced apart at a predetermined distance B from each other, to accommodate therebetween the width sizes of vehicles to be washed by the system 10. In the example shown, the vehicle may move through wash system 10 in the direction indicated at C.

It should be recognized that dependent on the types of vehicles to be washed, the dimensions of the bridge rails 14 and 16, and bridge assembly can be modified accordingly. The bridge assembly 12 may be supported on the bridge rails 14 and 16 by flanged wheels 18 and 20, or other suitable members to allow movement of the bridge assembly 12 relative to the bridge rails 14 and 16 while supported thereon. The bridge assembly 12 may have a drive system associated with therewith, generally indicated at 21, which may simply be a motor 22 adapted to rotatably drive a drive member 24 which is coupled to at least one of the wheels 18 and 20, to selectively cause driving rotation of the wheels 18 in the example shown. The bridge rails 14 and 16 may simply be beams on which flanged polymeric wheels 18 and 20 are supported, with wheels 18 provided with a friction surface to allow the wheels 18 to drive the bridge assembly 12 when rotated upon actuation of motor 22 and rotation of shaft 24. The bridge drive assembly 21 is adapted to operatively and selectively move the bridge assembly 12 bi-directionally along the bridge rails 14 and 16.

The bridge assembly 12 also may include at least one, and in this example, first and second trolley assemblies 26 and 28 supported in association with a pair of trolley rails 30 and 32. The bridge assembly 12 may be formed as a framework of members including the trolley rails 30 and 32 for example, or any other suitable structure. For the purposes of discussion herein, the bridge assembly 12 provides a system to movably support the elements of the present invention, and for purposes of illustration the bridge assembly 12, as depicted in the figures, has the form of bridge end members 34 and 36, with trolley rails 30 and 32 extending therebetween. The trolley rails 30 and 32 are spaced from one another and extend laterally across the bridge assembly 12. The trolley rails 30 and 32 are operatively supported within the bridge assembly 12, and may be mounted to the bridge end members 34 and 36. The pair of opposed trolley assemblies 26 and 28 are operatively supported by the trolley rails 30 and 32, and bridge assembly 12, and are moveable toward and away from one another in a direction generally transverse to the rectilinear movement of the bridge assembly 12. More specifically, the pair of opposed trolley assemblies 26, 28 are movably supported on and operatively moved along the trolley rails 30 and 32, such as by pairs of spaced apart flanged wheels 38 and 40. A trolley drive system generally indicated at 42 may be used to selectively drive the trolleys 26 and 28 on trolley rails 30 and 32. The trolley drive system 42 may comprise a motor 44 adapted to drive an axle 46 associated with a pair of the wheels 38 or 40 for example. In the example shown, a trolley drive assembly 42 is adapted to operatively and independently move the trolley assemblies 26 and 28 bi-directionally along the trolley rails 30 and 32. Other suitable drive systems are contemplated, and a drive system that allows the trolleys 26 and 28 to be moved together (like a curtain) could be used.

As illustrated in the figures, by way of non-limiting example, to provide movable support of the trolley assemblies 26 and 28 on trolley rails 30 and 32, the flanged wheels 40 are selectively driven to move the trolley assemblies 26 and 28 toward and away from one another on the trolley rails 30 and 32. As best seen in FIG. 2, the trolley assemblies 26 and 28 each may include a housing type arrangement carrying the pairs of wheels 38 and 40, and is secured to the trolley rails 30 and 32 by any suitable structure to positively secure the trolley assemblies 26 and 28 to rails 30 and 32, while allowing movement of the trolley assemblies 26 and 28. The trolley assemblies 26 and 28 may also include suitable systems to detect or provide the exact position of the trolleys 26 and 28 along the trolley rails 30 and 32.

The trolley assemblies 26 and 28 may further include at least one spray or cleaning arm 50 having a plurality of spray heads or nozzles 52. Alternatively, or in addition, the trolley assemblies 26 and 28 spray bars 50 could be replaced with conventional spinning brushes adapted to contact the vehicle surfaces as the bridge 12 moves adjacent a vehicle. As will be described hereafter, the tracking of a vehicle during a cleaning process as provided by the present invention greatly enhances the performance of spray cleaning systems and/or brushes, and both or one or the other may be used if desired. Although referred to as spray arms, it should be understood that the arms 50 may have cleaning brushes associated therewith if desired. It should also be recognized that although the example shows two trolleys, each having at least one spray or cleaning arm, only one trolley and cleaning arm could be used and moved across the entire width of the bridge 12. As shown in FIG. 2, the spray arms 50 in the example shown are designed to deliver cleaning fluids to the vehicle 60. Each one of the pair of spray arms 50 are operatively supported by a corresponding one of the opposed trolley assemblies 26 and 28. More specifically, the spray arms 50 include a series of spray nozzles 52 that are pivotably supported on the spray arms 50, to allow oscillation thereof over a predetermined angle. The spray arms 50 may comprise a framework which pivotally supports each of the nozzles 52 at a desired location. The spray nozzles 52 are selectively pivoted by a drive system which may include a motor 54 attached to a linkage system comprising linkage arms 56 extending from the motor 54 and the individual spray nozzles 52 to adjacent spray nozzles 52. Upon actuation of the motor 54, the linkage arm 56 attached thereto causes pivotal motion of the first spray nozzle 52, with additional linkage arms 56 attached to respective nozzles 52 to in turn cause pivotal motion of each nozzle 52 in an oscillatory motion. Alternatively to the use of oscillating spray nozzles, the nozzles could be made to move linearly along a slide or the like, or may just be fixed, and may be provided with a wider spray pattern or adjustable spray pattern if desired. As shown in this example, the spray arms 50 may be configured to dispose the individual nozzles 52 at desired distances from the vehicle 60, such that each of the nozzles 52 is disposed adjacent a portion of the vehicle 60 to provide effective dispensing of cleaning fluids to adjacent surfaces of the vehicle 60. The upper nozzles 52 may be situated inwardly of lower nozzles to accommodate the shape of vehicle 60 which may have a profile which tapers toward the top of vehicle 60. The number and configuration of spray nozzles 52 allow for complete coverage of the entire surfaces of the vehicle 60. Other suitable spray arm 50 configurations and nozzles 52 configurations are contemplated to provide desired spray action of cleaning fluids on all surfaces of the vehicle 60. The spray arms 50 may be configured as the supply manifold for supplying cleaning fluids to each of the nozzles 52. The frames of the spray arms 50 may provide an attachment point for the delivery of the fluid wash solutions to the spray nozzles 52 for washing a vehicle 60 positioned within the system 10. In an example, a fluid supply system (not shown) may be coupled to the spray arms 50 through a supply system that is mounted on the frame structure associated with the trolley assemblies 26 and 28 and trolley rails 30 and 32, with the system allowing the fluid supply to extend from the location of the bridge rails 14 and 16 to a central area of the trolley rails 30 and 32 to accommodate the movement of the trolley assemblies 26 and 28 from outboard to inboard positions. Alternatively, the cleaning fluids may be supplied by other suitable fluid connections, such as by flexible hose assemblies, to the spray nozzles 52. The cleaning fluids are supplied by a high pressure pump system (not shown) to deliver a source of pressurized wash fluids to the nozzles 52.

Figure 5:
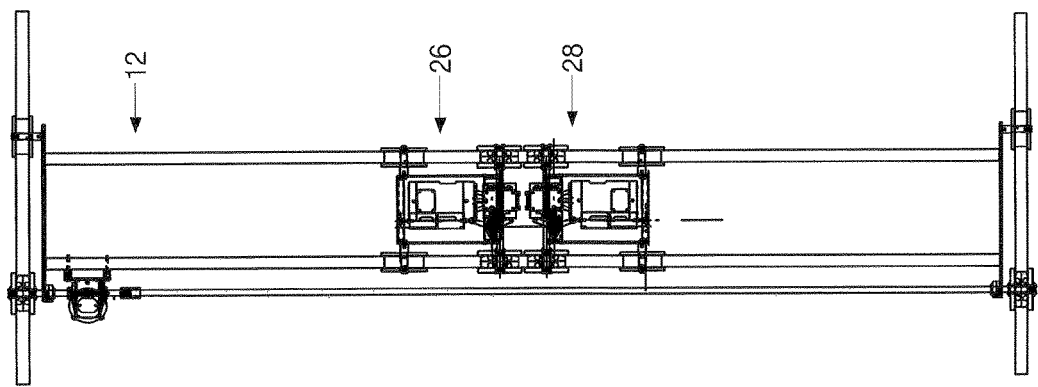
FIG. 5 is a top view of the wash system showing the trolley assemblies at an inboard position.
Figure 4:
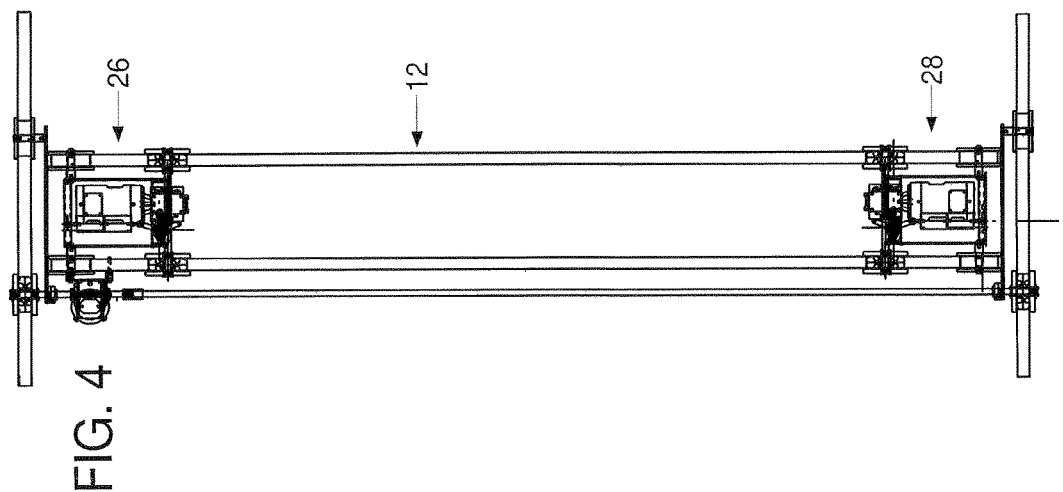
FIG. 4 is a top view of the wash system showing the trolley assemblies at an outboard position.

More specifically in the example shown in the figures, the trolley assemblies 26 and 28 each carry a spray arm 50 so the spray arms 50 are movable opposite to each other across the trolley rails 30 and 32, allow relative movement of the spray arms 52 toward and away from one another between fully outboard and fully inboard positions. As seen in FIG. 4, the trolley assemblies 26 and 28 are shown in a fully outboard position, while in FIG. 5, the trolley assemblies are shown in fully inboard positions. The spray arms 50 are also connected to the trolley assemblies 26 and 28 to allow rotational movement of the spray arms 50 relative to the respective trolley assembly. The rotational movement of the spray arms 50 may be provided by a drive system including a drive shaft 64 operated by a suitable actuator (not shown), such as an air cylinder, motor or other suitable actuator for example. In operation, the spray arms may be selectively rotated a desired amount to position the spray nozzles 52 to dispense cleaning fluids onto the surfaces of the vehicle 60 depending on the location of the spray arm 50 relative thereto, as will be described further hereafter. Further, the position of the spray arms 50 relative to a vehicle 60 may be varied by causing movement of the spray arm toward or away from the vehicle, such as by pivoting of the spray arm 50 about an upper joint 51. Alternatively, the spray arms may be provided with at least one sensor or the position of the spray arm controlled based upon the detected width of a vehicle 60 to position the spray arm 50 at a desired spaced position from surfaces of the vehicle 60. As seen in FIG. 2, the spray arms 50 are positioned to direct cleaning fluids inwardly toward the vehicle 60 when the trolley assemblies 26 and 28 are in the outboard position as seen in this figure. As seen in FIG. 5, when the trolley assemblies 26 and 28 are at their inboard positions, the spray arm 50 can be rotated to direct spray nozzles 52 toward the front of a vehicle positioned in the system 10, and also may be rotated in an opposing manner to direct spray nozzles 52 toward the back of the vehicle, as the vehicle 60 moves through the system 10, or relative to a stationary vehicle positioned in the system 10.

In operation, the trolley assemblies 26 and 28 are selectively driven together or separately on the trolley rails 30 and 32, and the position of the spray arms 50 operated such that the spray arms 50 are rotated between facing toward the front of the vehicle 60, toward the side of the vehicle 60 and then toward the rear of the vehicle 60. If desired, each trolley assembly 26 and 28 may include a trolley stop (not shown) to prevent movement of the trolley assemblies past predetermined positions on the rails 30 and 32.

The system 10 may also include a top wash system generally indicated at 65 in FIGS. 1 and 2, the operation of which will be described in more detail hereafter. The top wash system 65 may be supported in association with the bridge assembly 12 and is designed to wash the top of the vehicle 60. The top wash system 65 may include at least one spray arm 66 that includes at least one or a series of spray nozzles 67 that are pivotably supported on the spray arm 66 to allow oscillation thereof over a predetermined angle. The spray nozzles 67 are selectively pivoted by a drive system which may include a motor 68 attached to a linkage system comprising linkage arms 69 extending from the motor 68 and the individual spray nozzles 67 to adjacent spray nozzles 67. Upon actuation of the motor 68, the linkage arm 69 attached thereto causes pivotal motion of the first spray nozzle 67, with additional linkage arms 69 attached to respective nozzles 67 to in turn cause pivotal, oscillatory motion of each nozzle 67. Alternatively to the use of oscillating spray nozzles, the nozzles could be made to move linearly along a slide or the like, or may just be fixed, and may be provided with a wider spray pattern or adjustable spray pattern if desired. As shown in this example, the spray arm 66 may be configured to dispose the individual nozzles 67 at a desired distance from the vehicle 60, such as each of the nozzles 67 being disposed adjacent a portion of the top of vehicle 60 to provide effective dispensing of cleaning fluids to adjacent top surfaces of the vehicle 60. If desired, certain spray nozzles 67 may be situated downwardly of other nozzles to accommodate the shape of vehicle 60 which may have a top profile which tapers downwardly at the sides for example. The number and configuration of spray nozzles 67 allow for complete coverage of the entire top surfaces of the vehicle 60. Other suitable spray arm 66 configurations and nozzle 67 configurations are contemplated to provide desired spray action of cleaning fluids on all top surfaces of the vehicle 60. The spray arm 66 may be configured as the supply conduit for supplying cleaning fluids to each of the nozzles 67 similar to spray arms 50 described previously. The top wash system 65 may be positioned at a predetermined height relative to the bridge assembly 12 to accommodate all expected vehicle heights, and may be stationary, or if desired, can be movable to vary its position and relative height to a particular vehicle 60 in the system 10.

The system 10 may further include a sensor system generally indicated at 70, including a plurality of sensors (only some sensors shown in the FIGS.) to allow for desired operation and adjustments of the system for effective cleaning of a vehicle 60. The sensor system 70 may include a plurality of sensors, such as optical sensors, ultrasonic sensors, proximity sensors, and/or other suitable types of sensors, that may be positioned along the length of the system 10, and at different heights relative to the vehicle 60. For example, a first sensor 72 may be positioned to sense the movement of a vehicle 60 into the system 10, and to initiate operation of a control system 80 which controls various functions in a cleaning operation. The control system 80 may be any suitable control system, such as a processor based system which controls various systems via suitable control interfaces associated with different systems. A second sensor 74 may be provided to monitor movement of the vehicle through the system 10, and to control systems based on the speed of the vehicle as it moves through system 10, and/or such that if the vehicle stops for any reason, the operation of various systems is suspended for example. The movement of the vehicle may also be set by means of the speed of a conveyor system used to move the vehicle through system 10, with the speed of the conveyor system known and used to operate systems in the desired manner. The sensor system 70 may also include one or more sensors 76 to sense the height of a vehicle 60 entering the wash system 10 for example.

In addition to controlling various components during normal wash cycle operations, the sensor system 70 supplies signals to a controller 80, which may also respond to environmental conditions to warn of an alarm event and/or inhibit operation of the system 10 under certain operational or environmental conditions. For example, system 10 may be provided with one or more sensors that provide signals indicative of certain operational parameters such as movement of the conveyor, whether an access door is in an open or closed state, or other parameters. If the desire operational parameters are not correct, the controller 80 may inhibit operation of the system 10. The wash system 10 also may include one or more temperature sensors. The temperature sensors provide signals indicative of the temperature of the ambient environment in which each sensor is located to the controller 80. In an example, one or more temperature sensors may be associated with the plumbing manifold system (not shown) to monitor the temperature of one or more fluids in the plumbing manifold system. When the temperature of a fluid in the plumbing manifold falls below a threshold value, the controller 80 may provide an alarm to the system user thereby warning the user that it may be too cold to execute a wash cycle, or prevent execution of a wash cycle when the temperature of a fluid is below the threshold value. Additionally, another temperature sensor may be disposed to monitor the ambient temperature of the wash system environment, wherein if the ambient environment falls below a threshold value, the controller 80 may provide an alarm to the system user thereby warning the user that it may be too cold to execute a wash cycle, or may prevent execution of a wash cycle when the temperature of the ambient environment is below the threshold value. Temperature sensing may also allow for execution of protective measures, such as for example, purging one or more lines of the plumbing system before they freeze and cause damage to the system 10.

The control system 80 may further include a maintenance program that may be used to provide access to network/modem settings, system diagnostics, and to enable (activate) or disable (deactivate) options. A network and/or modem connection settings menu may allow the user to modify settings used to connect the wash control system 80 to a computer network. These connections also may be used to update software, remotely monitor the wash operation, review data logs and statistics, activate options, and/or troubleshoot. A system diagnostics routine may include options that allow the user to manually access select wash outputs to verify the functionality of components outside of normal wash processes. A chemicals control may be accessed to allow the user to control titration of chemicals for altering wash performance by controlling spray functions of the wash system outside of normal wash process. A general options menu may be used to allow the user to enable (activate) and/or disable (deactivate) wash options. This may include activating/deactivating existing wash options or activating added wash options, such as spot free water application, an underbridge spray add-on, a dryer add-on, a spot-free rinse add-on, and the like. A system setup menu may be used to provide access to system operation parameters that alter various wash performance and functional characteristics of the wash system. For example, options may allow the user to set the system clock, wash timers for various wash functions, including conveyor speed, bridge distance movement, soap timer, rinse timer, and bridge speed as examples. These options may be customized for each of several multiple programmed wash packages for example.

Thus, each of the pair of spray arm assemblies 50 move in a number of ways about the vehicle, along with the respective trolley assembly 26 and 28 and bridge assembly 12. With reference to FIG. 6 and FIGS. 7-15, the operation of the system in an example using a vehicle conveyor to move the vehicle 60 through system 10 at a constant speed will be described. In such types of wash systems, there may be used a tunnel control system to operate the conveyor and other systems, such as a drying system or other equipment, and the wash system 10 may be integrated into the overall system. First, the system through one or more sensors, may sense the vehicle conveyor running, along with conveyor speed and vehicle length at 100, which is used to calculate speeds of operation of system 10. If the conveyor is stopped, the control system 80 may be used to inhibit motion of the bridge assembly 12. At 102, the height and width of the vehicle 60 is sensed, and used to operate the top wash system 65 and/or the operation of the top spray nozzle 52 associated with the spray arms 50, along with positioning of the spray arms 50 relative to the vehicle as will be described further hereafter. For example, if the vehicle height is below a predetermined height, the top wash system 65 may be turned off, as it may not be needed for effective cleaning of the hood and roof of the vehicle 60. Further, depending on the height of the vehicle 60, the top spray nozzle 52 may not be needed, and may be selectively not activated to conserve washing fluid and power.

Figure 6:
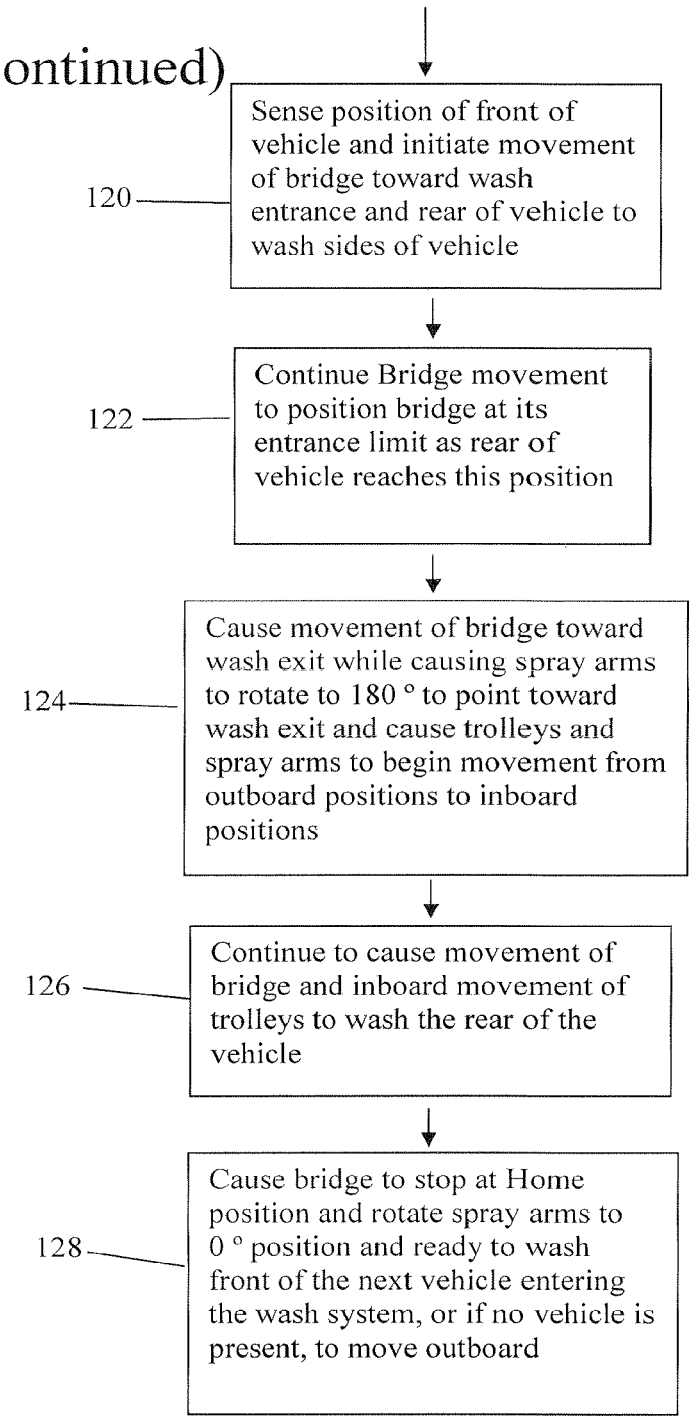
FIG. 6 is a flow chart describing operation of the system in an example.
Figure 7:
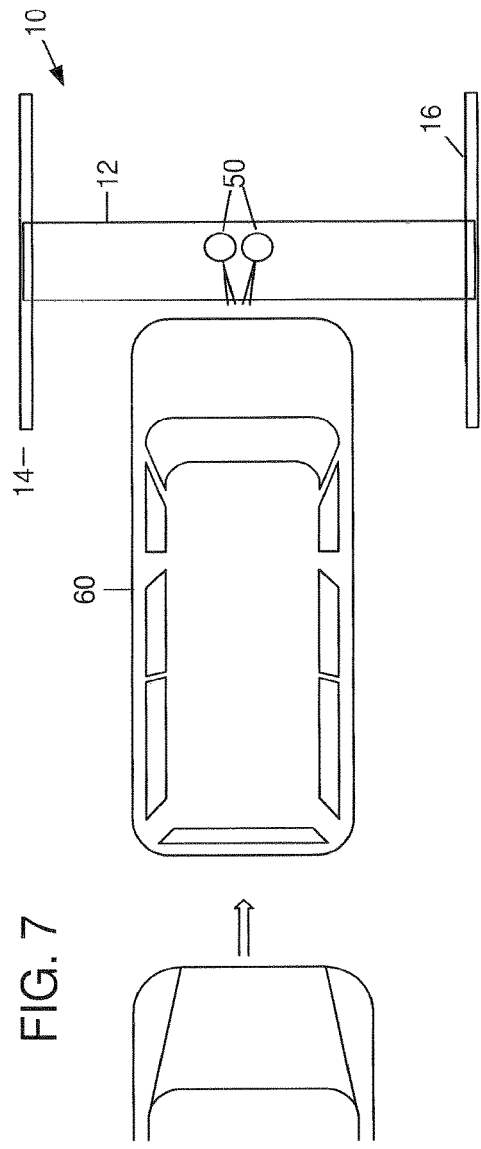
FIG. 7 is a partial schematic top view showing an initial stage of operation of the wash system according to an example.

At step 104 of FIG. 6, the control system 80 may initially dispose the bridge 12 at a "home" position, such as at approximately the middle of the bridge rails 14 and 16, which is the center of the longitudinal travel of the bridge 12. At the home position, the trolleys 26 and 28 may further be positioned at the outboard position, and the spray arms 50 directed inwardly or at a 90 degree position relative to the wash entrance. Other home positions may be adopted as may be desired, but effectively, the home position is the ready position of the system 10 to initiate washing of a vehicle as it is moved on a conveyor system toward and through the wash system 10. Upon a vehicle approaching the wash system 10 at 106, the trolleys 26 and 28 are moved to the position shown in FIG. 7, such as by a sensor which detects the approaching vehicle and activates the machine 10 to begin washing the vehicle. In an example, the tunnel controller may be used to issue an "Extend & Activate" Input, causing the system to extend and activate the trolleys 26 and 28 to move to their inboard positions along with spray arms 50. This input also causes the spray arms 50 to extend to their inboard limits and as they leave their outboard limits, and rotates them to the 0 degree position or to spray toward wash entrance and oncoming vehicle 60. Just prior to the vehicle reaching the machine, the tunnel controller or machine controller 80 will activate the high pressure water pump at 108, and at the same time produce a machine controller 80 "Oscillate" input, which will start the nozzle oscillator motors and cause oscillation of the spray nozzles 52. Depending on the height of the vehicle as sensed, the top spray nozzle 52 and/or top spray arm 65 may or may not be activated.

Figure 8:
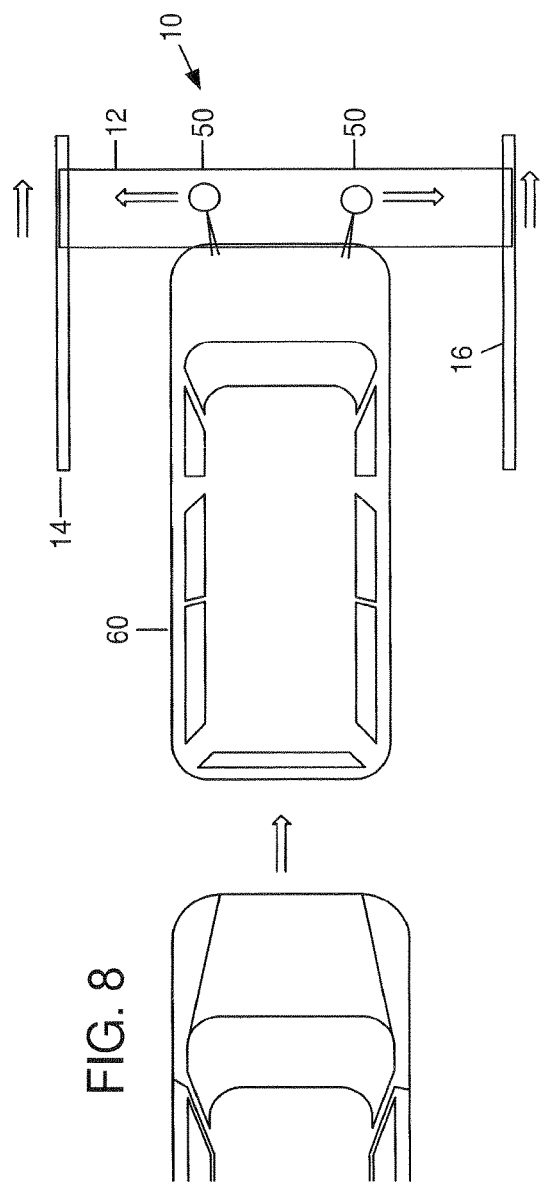
FIG. 8 is a partial schematic top view showing an intermediate stage of operation of the wash system according to an example.

For washing the front of the vehicle 60, the system initiates movement of the bridge 12 toward the wash exit at 110 and as shown in FIG. 8, at a predetermined speed relative to the movement of the vehicle 60. In one example, a first Bridge Photo-eye sensor 72 of the sensor system 70 may function as an initial start signal to get the bridge 12 moving. At 112, a second Bridge Photo-eye 74 may then be used as a primary control input for controlling motion of the bridge 12 relative to the vehicle 60. Breaking the second photo-eye 74 beam may cause, through machine controller 80, the bridge 12 to accelerate toward the wash exit away from the oncoming vehicle 60, while making the beam allows the bridge 12 to decelerate to a stop. In this manner, as the vehicle 60 approaches the bridge 12 and breaks the beam of the first bridge photo-eye 72, the bridge 12 begins to accelerate toward the exit. The initiated acceleration and movement of the bridge 12 is set so it accelerates faster than the movement of the vehicle until the beam is remade and then stops accelerating, letting the vehicle 60 catch up, such that the vehicle 60 repeatedly breaks the beam after which the beam is made, causing movement of the bridge assembly in a pulsing motion forward ahead of and relative to the moving vehicle toward the wash exit. The bridge 12 is thus moved slightly faster that the conveyor moving the vehicle 60, and it therefore pulses forward slightly ahead of the vehicle 60, and then decelerates, waiting for the vehicle 60 to break the beam of second photo-eye 74 again. Correct setting of bridge 12 speed and the acceleration and deceleration ramp settings may be set to minimize this pulsing motion. For example, it is estimated that there should be approximately a 0.8 second acceleration ramp and a 1.5-2.0 second deceleration ramp for example. Maximum bridge 12 velocity should be approximately 25-40% higher that maximum conveyor speed. In this manner, the bridge 12 is moved slightly ahead of the vehicle 60 as the vehicle moves through system 10 at 112.

The same commands that cause the bridge 12 to move forward of the vehicle 60 may also cause the trolleys 26 and 28 and associated spray arms 50 to retract and move outboard at 114 and as shown in FIG. 8. Both the bridge and trolleys/spray arms move at speeds that are calculated using formulas that consider conveyor speed, vehicle length and bridge travel available (length of the bridge rails 14 and 16). The simultaneous forward motion of the bridge 12 and outboard motion of the trolleys 26 and 28 and associated spray arms 50 results in the spray arms 50 moving at an angle, such as a 30-45 degree angle, away from the vehicle 60. For example, a bridge with 5.5 ft. of travel has a 30-degree motion of the spray arms 50 while a bridge 12 with 8 ft. of travel will have a 45-degree motion. The result is that the spray arms 50 move forward at substantially the same speed as the vehicle 60, and stay substantially a predetermined distance, such as 18" away from the vehicle 60, as they move outboard across the front of the vehicle 60 to wash the front of vehicle 60.

With the sensed width value of a vehicle 60, when the vehicle 60 initially breaks the first bridge photo-eye 72 and the bridge 12 is moved forward (toward the wash exit) of the home position flag, the value of the width measurement may be captured and stored. For example, an ultrasonic sensor 76 may provide an analog value of the width measurement which is captured and stored. This sensor 76 may be located approximately 6-7 ft. toward the wash entrance from the bridge home position and points directly at the side of the vehicle 60. Measuring from the passenger side of vehicle 60 may be performed and/or measuring from the driver side if desired.

Thereafter, the system may be operated to transition to wash the sides of vehicle 60. The continuing movement of the bridge 12 toward the wash exit with the vehicle 60 while the spray arms 50 are moving outboard, provides the washing the front of the vehicle 60 as described. After washing of the front of the vehicle, the spray arms 50 will be fully retracted at or near the same time that the bridge stops at the exit limit at 116 and as shown in FIG. 9, corresponding to the length of travel on bridge rails 14 and 16. As soon as the spray arms 50 reach their outboard limits, they are caused to both turn to their 90-degree positions at 118 to be directed to spray directly at the sides of the vehicle 60. The passenger side spray arm 50 (and/or the driver side arm 50) may also be immediately moved toward the vehicle to adjust to be a desired distance, such as 18 inches, away from the side surfaces of the vehicle 60. Based upon the tunnel configuration, the driver side of the vehicle 60 may be in a known position such that only the passenger side spray arm 50 needs to be adjusted to be positioned at a desired location relative to the side of the vehicle 60 based on the measured width. It should be recognized that as the spray arms are positioned at a predetermined distance, such as 18 inches, in front of the vehicle 60 while washing the front of the vehicle 60, there will be some time, for example a couple of seconds, before starting spraying the side of the vehicle. This gives some time to rotate the spray bars 50 and extend one or both toward the vehicle 60. The function of extending the spray arm or arms 50 toward (or away) from the vehicle 60 may use the width measurement, wherein the "extend" time for the passenger spray arm is calculated from the analog value of the ultrasonic width sensor 76. For example: If a small car has an analog signal of 20 mA, then the machine control system 80 extends the spray arm toward the car for 2 seconds. If a wider car has an analog signal of 10 mA, then extend the spray arm toward the car for 1 second. Vice-versa, if the analog signal value has an inverse rather than a direct relationship to distance. This method of adjusting to the width of the car is achieved with the least amount of programming and sensors. Alternately the spray bar 50 can stop retracting at the correct width (i.e., 18" from vehicle) rather than traveling to its width limit, and then inboard to the correct width. The washing of the sides of vehicle 60 may then proceed as follows. By the time that the spray arms 50 have rotated and moved inboard to the desired position, the front of the vehicle 60 will have broken the beam of a third bridge photo-eye 78, which may be referred to as a bridge exit side photo-eye sensor.

The bridge 12 is then made to move in a rearward motion toward the wash entrance to perform washing the sides of the vehicle 60 at 120 and as shown in FIGS. 10 and 11. The speed that it is moving is calculated such that the bridge 12 will reach its entrance limit at the extent of bridge rails 14 and 16 at approximately the same time the rear of the vehicle 60 reaches the same point at 122 and as shown in FIG. 12. Once the bridge 12 begins its rearward motion, it may be "latched" on until it reaches the entrance limit. Only the stopping of the conveyor will inhibit the motion. As mentioned previously, and as shown in the example of the FIGS., there may be four spray nozzles 52 per spray arm 50. As the sides of the vehicle are being washed the top nozzles may be turned on or off as needed for taller or shorter vehicles 60.

Thereafter the system may transition to wash the rear of the vehicle 60. The bridge has reached the entrance limit, and as the rear of the vehicle pulls away, the bridge 12 and corresponding spray arms 50 are moved toward the machine exit at 124 and as shown in FIG. 13. In an example, to perform this function, the third bridge photo-eye 78 (at exit side of bridge 12) becomes un-blocked. The bridge 12 responds by moving forward until the eye 78 is again blocked. In this way the bridge "pulses" and follows the rear of the vehicle 60. The same commands that cause the bridge to move forward also cause the trolleys 26 and 28 and associated spray arms 50 to move inboard at 126 and as shown in FIG. 14. When the spray arms move off of their outboard limits (or virtual outboard limits) they are rotated to the 180-degree position pointing toward the wash exit and rear of vehicle 60. The "virtual limit" for a spray arm 50 may be the position that the spray arm is moved when it is adjusted to the width of the vehicle 60. In this manner, washing the rear of the vehicle 60 is performed as the bridge 12 moves forward and follows the vehicle 60 while the spray arms are moved inboard. As in the front washing scenario, both the bridge 12 and spray arms 50 are made to move at speeds that are calculated using formulas that consider conveyor speed, vehicle length and bridge travel available (the length of the bridge rails 14 and 16).

Figure 15:
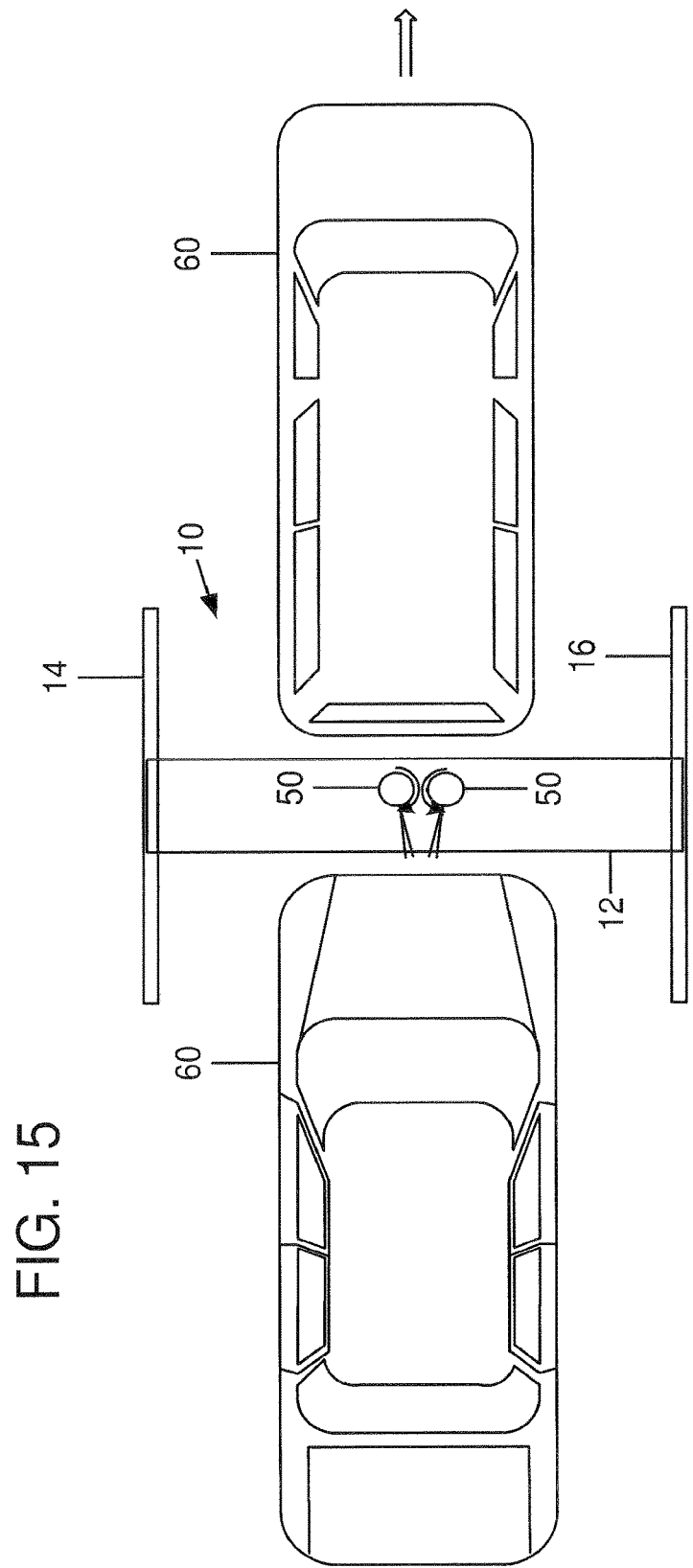
FIG. 15 is a partial schematic top view showing a final stage of operation of the wash system according to an example.

Once the rear of the vehicle 60 is washed in this manner, the bridge may be reset at the home position at 128. By the time that the bridge 12 reaches the center of its rails and trips a "home limit" switch, the spray arms 50 should be fully inboard. The bridge 12 is made to stop moving and the spray arms are rotated back to the 0-degree position (toward wash entrance) as shown in FIG. 15. At this point the machine is ready to wash the front of the following vehicle 60 and begin the process over again. It should be noted that when the spray arms 50 rotate from spraying the rear of one vehicle 60 to immediately spray the front of the next vehicle 60, the spray arms 50 are right next to each other, and it may be desirable to avoid spraying each other with considerable force. If desired, the machine controller 80 can produce an output, which will momentarily open a "dump" valve on the high-pressure water pump. This will reduce the water pressure and volume enough to prevent any damage to the spray arms 50 that could occur. Alternately, the system can be operated to temporarily reduce the spray impact by briefly reducing the speed of the pump motor. If there is not another vehicle 60 approaching, the tunnel controller may cause release of the "extend and activate" output. This may cause the trolleys 26 and 28 and associated spray arms 50 to retract to their outboard limits, and upon reaching those limits, the spray arms can be rotated to the 90-degree position and point inboard.

As described in this example, the sensor system 70 may include various sensor inputs, which may be sourcing and photo-eyes to be light operated, but other suitable sensors may be used. Although the example has described the use of first, second and third bridge photo-eyes, 72, 74 and 78, other suitable sensor arrangements are contemplated, such as eliminating the first photo-eye 72 and initiating operation of the system 10 in another suitable manner. In the example, photo-eyes 72 and 74 are positioned at the bridge entrance side, while photo-eye 78 is positioned at the bridge exit side. Proximity sensors may be used at the bridge entrance limit position, the home limit position, and the bridge exit limit position. Further, a proximity sensor may be used to detect the movement of the bridge 12 at the entrance side of the home position, or such position can be supplied by suitable programming of controller 80 based on known bridge speed, and bridge travel distances. In addition, there may be provided in association with the spray arms 50, arm retract and extend limit sensors, such as proximity sensors, to facilitate positioning of the arms 50 at the outboard and inboard limits. For safety of operation, the spray arms 50 may also have impact sensors, such as proximity sensors, to stop operation of the system if the vehicle becomes too close to or impacts the arms 50. The machine controller 80 may be supplied with signals from such sensors and/or the tunnel controller used in operation of other systems and the conveyor moving the vehicle through system 10 if desired, and the tunnel controller may also be used in operating various systems on machine 10, such as the oscillation of nozzles 52, the "Extend and Activate" movements of the bridge 12 and trolleys 26 and 28/spray arms 50, wherein activation of bridge 12 motion, turning on early and off late functions of the spray arms, bridge and pumping systems and the like can be controlled, or other aspects and functions if desired. Using the tunnel controller for operation of various functions can facilitate preventing problems with walk and drive-through issues for example. Further, other sensors may be used to monitor functions such as whether the conveyor is running, or such information may be supplied by the tunnel controller to machine control system 80 for example. Using the tunnel controller for operation of the spray arm "Extend and Activate" movements can allow disabling of these functions to wash only the sides of the vehicle if desired. Conveyor speed may be monitored by a pulse switch, or by the first two photo-eyes 72 and 74 as described, or other photo-eyes for example. Although vehicle length can be determined from the photo-eyes or other sensors, such as a pulse switch, could be used. The vehicle height sensor(s) may be used in conjunction with the tunnel controller or machine controller 80 as may be desired. There may also be provided a manual operation interface for performing maintenance for example, which may utilize an enable key or password to operate for safety, to allow functions such as Bridge Forward (momentary stop at Home), Bridge Reverse (momentary stop at Home), Extend Driver and Passenger Arms, Retract Driver and Passenger Arms, Rotate Arms to 0 to 180 degrees, a Reset Button (such as for after Impact, VFD or other fault), or other functions. If desired, there may also be provided arm 50 rotation verification sensors, a sensor mounting T-bar impact sensor (although loss of eye signals can be used), and additional "backup" set of photo-eyes, or the like. Also, the controller 80 can perform other functions if desired, such as: Auto-reset, Cycle/Car Counter, Maintenance Prompts/Maintenance Log, Self-Diagnostics via redundant sensors, verifying sensors changed state, timed motions (timers stopped when conveyor stops) and/or startup test, Remote Access or the like. If desired, the system controller 80 and associated sensors may also serve sense spare tires, wheel chair ramps, snow plow lift & lights, rear hitch mounted racks, or other equipment that may be mounted on vehicles, and programmed to accommodate power outages, customer drive through/drive away at any point in the wash or reset process, employee walk through, conveyor stop and restart, varying conveyor speed, impending or actual impacts and resets with vehicle at any point in the wash cycle, conveyor belt style and other variables. Alternatively to the use of sensor systems, the controller 80 may receive a signal indicating entrance of a vehicle into the wash system 10, and then simply use the known speed of the conveyor and vehicle through the wash system 10 or position of a stationary vehicle in the wash system 10 to move the bridge. Trolleys, spray bars or other components in the desired manner.

As described with reference to this example, the movement of the spray arms 50 to wash the front and rear of the vehicle as it moves through the system 10 may utilize a plurality of photo-eyes and acceleration/deceleration of the bridge to provide such functioning, though other suitable approaches are contemplated. In association with such acceleration/deceleration functions, the deceleration ramps may utilize the speed of the bridge 12 and trolleys 26 and 28, which are varied according to the conveyor speed and vehicle length. In order to have the bridge 12 and trolleys 26 and 28 stop at the same point each time (end limits), the Deceleration Ramp times may be based on the actual speed of bridge 12 and/or trolleys 26 and 28. For example, if the bridge 12 speed is 1 ft/sec and the deceleration ramp time is 1 second, then the bridge 12 will stop 6" past the point that the photo-eye switch is tripped. If however, the bridge speed is 0.5 ft/sec then the deceleration ramp time needs to be 2 sec in order to park the bridge 12 at the same point 6" past the limit switch. The following formulas may be used accordingly: Distance=Velocity×0.5×Time (Distance may be a fixed quantity, such as 0.5 ft) and Time=(Dist×2)/Velocity The speeds of the bridge 12, trolleys 26 and 28 and spray nozzle oscillation speeds may also be set to provide desired washing characteristics. In an example, the nozzles 52 may be positioned 4" behind the centerline of the spray bar pivot point. The nozzles 52 gain or lose distance as they rotate from washing the front, to the sides, to the rear of vehicle. The nozzles 52 may be set to track 18" from the vehicle, with the photo-eyes 74 and 78 spaced 28" apart (14" plus 4" offset times 2). The trolley travel distance is approximately 4 ft. each in this example. The formulas for the speeds of these components may then be based on Vehicle Length+2.33 ft because the centerline of bridge 12 is 14" in front of the of the vehicle and 14" behind the rear of vehicle when bridge 12 is at either end of it's travel. The speeds are average and not instantaneous, and do not consider ramp times, though it should be understood that instantaneous speeds and/or ramp times may be used in calculating the operation of the systems. General or basic formulas which may be used to set the speeds are as follows:

Time Available to Wash Front or Rear=½ Bridge
  Travel/Conveyor Speed  (1)

Time Available to Wash Side of Car=(Car Length+
  2.33 ft−Bridge Travel)/Conveyor. Speed (the
  time available for bridge 12 to travel from front
  to rear limits)  (2)

Relative Wash Speed, Front or Rear=4 ft/Time
  Available to Wash Front or Rear (the speed that
  the spray arch moves across the vehicle surface,
  assuming trolleys 26 and 28 have 4 ft. of
  travel)  (3)

Relative Wash Speed, Side=(Car Length+2.33 ft)/
  Time Available to Wash Side of Car "Or" Rela-
  tive Wash Speed, Side=Conveyor Speed+Bridge
  Reverse Speed (the speed that spray arch moves
  across vehicle surface)  (4)

Minimum Nozzle RPM=Relative Wash Speed (ft/
  sec)×180 (relating to RPM at which Zebra
  striping does not occur using a 4"wide spray)  (5)

Surface Velocity (Surface Feet/second)=Relative
  Speed×10.35 (the speed that water spray travels
  across vehicle surface. Based on Min RPM &
  41.4" travel/rev)  (6)

Bridge Reverse Speed=(Conveyor Speed×Bridge
  Travel)/(Car Length+2.33 ft−Bridge Travel)  (7)

The system 10 may also have other features as may be desired for various applications, such as programming more than the top nozzle 52 (or other nozzles) to be on or off depending on the vehicle height (or other characteristics), to conserve water and reduce spray mist. The system 10 may also be configured to not use photo-eye sensors as described, utilizing the tunnel controller and known velocity, length and position of the vehicle 60. Although the use of photo-eyes 72, 74 and 78 can increase accuracy and safety of the machine, this alternative approach or other suitable approaches are contemplated.

In an alternate embodiment, the basic system design can be modified to have longer bridge rails 14 and 16 and used in an "In-bay" type wash system, where the vehicle 60 is stationary while it is washed. In such an alternative embodiment, the system will not need to provide for movement of the spray arms 50 to correspond to movement of the vehicle 60 as described above. Further, such a system may also include treadle, low water, temperature, door, security and wash package inputs to the control system 80, and may have pumps, shift valves, conserve valve, soap, wax, R.O., signs, dryer, ACW enable, heat, weep, door control, and other functions that may not be needed in the conveyor type system described above. In operation of such a system, a vehicle is parked in a wash bay that has a rigid frame with a pair of elevated, spaced bridge rails. The system may also employ additional devices to ensure that the vehicle is generally located at a predetermined position between the bridge rails and is at a predetermined depth within the bay. For example, some type of alignment pad having ridges accompanied by a visible indicator or sensors may be used for this purpose. As previously mentioned, the wash apparatus may also employ a control system with stored programming that operatively controls the functions of the rollover vehicle wash system. Furthermore, the control of the operative functions of the vehicle wash system include controlling the movement of the bridge assembly 12, trolley assemblies 26 and 28 and the spray arms 50, and also the delivery of the pressurized wash fluids to the spray nozzles 52. Once the vehicle is in place, its specific lateral and longitudinal location within the wash bay may be determined by a sensor system, such as similar to that previously described. This information is used by the controller to move the bridge 12, trolleys assemblies 26 and 28 and associated spray arms 50 at a predetermined distance from the front, sides and rear of the vehicle for cleaning thereof.

It should also be appreciated that the movements of the bridge assembly 12, the trolley assemblies 26, 28, and the spray arms 50 in the above examples, may be repeated quickly and efficiently for a number of cycles depending upon the desired effects. For example, a first such pass may either provide a pre-wash solution or begin with the main washing solution. Then, a second pass could provide a rinse and a third pass a wax solution application. It should be further recognized that an efficient change over of chemicals can be performed with the present invention.

Turning to FIGS. 16-18, an example of a top spray arm configuration is shown. The top spray arm 200 as shown may be configured to have a plurality of oscillating spray nozzles 202 therewith, similar to the examples previously described. Alternatively to the use of oscillating spray nozzles, the nozzles could be made to move linearly along a slide or the like, or may just be fixed, and may be provided with a wider spray pattern or adjustable spray pattern if desired. In this example, the top spray arm 200 is stationary, but designed to effectively clean the top surfaces of a vehicle, for vehicles of different heights. Such a spray bar configuration could also be used to clean side or other surfaces of the vehicle if desired. Although it may be possible to adjust the position of the spray bar and provide effective cleaning for different vehicle surfaces, such an approach requires a more complicated and costly system. Regarding spray nozzles, the impact or force of water impacting on a surface drops significantly (exponentially for all but the solid stream type) as the distance from the surface (vehicle) increases. This applies to all types of nozzles including fan, cone and solid stream nozzles. Controlling the impact (not too little or too much) is important for proper and safe cleaning of all types of vehicles and surfaces. The use of movable spray bars to keep the spray at a fixed or generally consistent distance from the vehicle can cause problems including higher cost, higher maintenance, increased complexity, and possibility of impacting the vehicle with the moving equipment. Also, any time that spray nozzles are placed in the path of the vehicle, customer driving errors and addition of equipment such as bike racks can create unintended impacts. The spray bar 200 can be used to eliminate the need to move the spray nozzles toward or around vehicles or they can be used to enhance the impact and spray angle of those that do.

In the example spray bar 200, the operation is altered to account for different height vehicles instead (or with respect to other vehicle surfaces, by providing variable impact and spray geometry configurations. In a first aspect, the spray bar 200 can vary the impact (force) of the spray directly proportional to the distance the nozzle(s) 202 are from the surface of the vehicle. Sensors may be used to determine the distance a spray nozzle 202 is from the vehicle surface and then the force of the spray can be adjusted using any of several approaches. Examples include varying the pump speed (which varies the volume), varying the pressure with a pressure regulator or other valving, or by varying the nozzle geometry or orifice size for example. It is noted that both the measurements and corresponding force adjustments can be made in steps or be infinitely variable. This can be applied to devices with nozzles that are fixed or movable (oscillating, spinning, etc). Movable spray nozzles could be made to oscillate or move linearly along a slide or the like, or may just be fixed, and may be provided with a wider spray pattern or adjustable spray pattern if desired. In an example, the method of sensing the distance to the vehicle may depend on the particular application. Generally, the method may use an ultrasonic sensor positioned substantially perpendicular to the surface or a plurality of thru-beam photo-eye pairs substantially parallel to the surface. The step of adjusting the power of the spray may use a variable speed control on the pump motor, or other suitable approaches can be used. In a second aspect of an example of the spray system 200, the system 200 uses nozzles 202 that oscillate, rotate or otherwise move through a given arc. In this case, the arc or angle of oscillation of the spray nozzle 202 can be varied inversely proportional to the distance the nozzle 202 is away from the vehicle. For example, for a spray nozzle 202 that is located 18" away from the surface of a vehicle and which rotates through an arc of 30 degrees either side of perpendicular, the spray of the nozzle 202 will cover a path 20.7" wide on the surface. If the distance from the nozzle to the surface is doubled, then the path that the spray covers is doubled, and the speed at which the spray traverses the surface is also doubled. The speed at which the spray traverses the surface is commonly referred to as Surface Feet per Minute. Controlling the distance that the spray travels across the surface of the vehicle, as well as the speed at which the spray travels across it can be used in the system 200 to provide effective cleaning. If there is a plurality of nozzles 202 spraying the vehicle, this feature controls the size of the spray coverage to achieve the desired amount of coverage overlap from nozzle to nozzle.

In an example of operation of spray system 200, the methods of driving the oscillating nozzles 202 and varying the arc or travel angle that the spray nozzles cover may include providing an electric or hydraulic motor 204 with a crank-arm 206 and a connecting rod 208 for driving a pivoting linkage arm 210. Adjusting the angle of nozzle 202 travel may use of an adjustable stroke mechanism. These mechanisms, such as Polar Cranks, Z-cranks or other mechanical mechanisms are commonly used in adjustable stroke metering pumps for example. Alternatively, the servo or stepper motor 204 can be programmed to oscillate though various degrees of arc. A further alternative could use a linear motor (which can be programmed to travel various distances) coupled to a pivoting arm. In each approach, the degree of nozzle travel is selectively adjusted to provide the desired spray characteristics depending on the distance of the surface to be cleaned relative to the nozzle 202. In the example shown, the high pressure cleaning solutions or water can be supplied to each of the nozzles 202 through a water feed manifold 212 forming a part of the support structure of the spray arm 200. Other supply arrangements are contemplated.

In the example, a system 200 using both variable geometry (travel) and variable volume/pressure provide the ability to effectively control the amount of impact on vehicle surface. The system 200 keeps the impact characteristics the same despite changes in distance, without having to move the spray mechanism closer to the vehicle. The system 200 can effectively control the speed (SFM) of the spray traveling across the vehicle surface and may control the distance the spray travels across the surface (spray coverage). In the system 200, the distance measurements and corresponding stroke angle adjustments can again be made in steps or be infinitely variable. The spray heads 202 in system 200 could have a linear movement, orbital movement, circular movement, or other movements if desired. In the example shown, the nozzles 202 have linear movement. The spray system 200 can use spray heads with nozzles 202 that are fixed or movable (oscillating, spinning in other planes, etc). In an example according to the FIGS., the distance from the spray bar system 200 to the vehicle 220 may be used to adjust the angle of spray as well as the pressure. Additionally or optionally, the length or position of the surface 222 being washed may be also be sensed and used to vary the angle of spray and/or the spray patterns. For example, the spray pattern could be adjusted if the vehicle is detected to be offset relative to the spray system or wider or narrower. This would move or offset the spray pattern to better target the surface, prevent excessive overspray, and/or conserve water.

In the case of the spray bar used as a top washer, an ultrasound or other suitable sensor (not shown), may be placed on either side of the vehicle 220 to measure it's width and relative position. From this information, the angle of the spray and/or the spray pressure may be set for desired cleaning. In the example shown, the servo motor 204 may be programmed to produce variable oscillating motion between 20 to 60 degrees or other desired angles. As shown, various vehicle 220 heights are shown, positioning the top surfaces of vehicle 220 at different spacings 230, 232, 234 and 236 for example, relative to the system 200. The variable spray angles produced provide effective cleaning of each of these surfaces, with the spray angle adjusted to provide overlap between spray patterns from each nozzle 202. As seen in this example, the surface 230 may be cleaned by a spray angle pattern of 60 degrees, causing overlap between the spray patterns from each nozzle 202 at this height, while surface 236 may be cleaned by a spray angle pattern of 20 degrees, causing overlap between the spray patterns from each nozzle 202 at this height. For the surface 232 and 234, variable angles between the angles used for surface 230 and 236 may be used to provide the desired spray patterns. As seen in FIG. 17, the vehicle heights that may be encountered could relate to different vehicle types, such as a van roof at 230, a minivan roof at 232, a pickup truck hood at 234 and a car hood at 236. It should be recognized that the ability to selectively vary the spray angles from nozzles 202 and/or spray pressure allows for effective cleaning of each of these surfaces as well as the different height surfaces on a vehicle, such as the hood/trunk and roof. For any vehicle surface, the spray pattern may be adjusted to allow for a desired amount of spray coverage per nozzle 202, such as approximately 24 inches coverage per nozzle 202, regardless of the spacing of system 200 relative to the vehicle surface. In this example, if the angle of spray was not adjusted between 60 degrees and 20 degrees for the different surfaces 230, 232, 234 and 236, the nozzle 202 coverage would be approximately 3.25 times greater and therefore the travel speed (SFM) of the spray would also be about 3.25 times faster, yielding undesirable washing characteristics. As also described, the pressure of the spray from each nozzle 202 may be variable to allow the desired pressure spray for a surface dependent on the spacing of the surface from the nozzle 202. In this manner, effective cleaning of surfaces regardless of the spacing from the spray bar 200 or nozzles 202 can be achieved.

As seen in FIGS. 18a and 18b, the spray nozzles 202 may also be configured to provide a desired spray pattern, with a 5 to 25 degree flat fan spray oriented in the direction of vehicle movement as an example. In FIG. 18a, the side view of a spray nozzle 202 is shown for a 5 degree nozzle, while FIG. 18b shows a front view of the spray pattern from such a nozzle. Other nozzle configurations are contemplated within the invention.

Alternatively, the spray system 200 could be used to wash the front, rear or sides of vehicles. For such uses, an ultrasound or other suitable sensor (not shown) may be placed adjacent the surface to be washed relative to vehicle 220 to measure the relative position, and set spray parameters accordingly.

Figure 3:
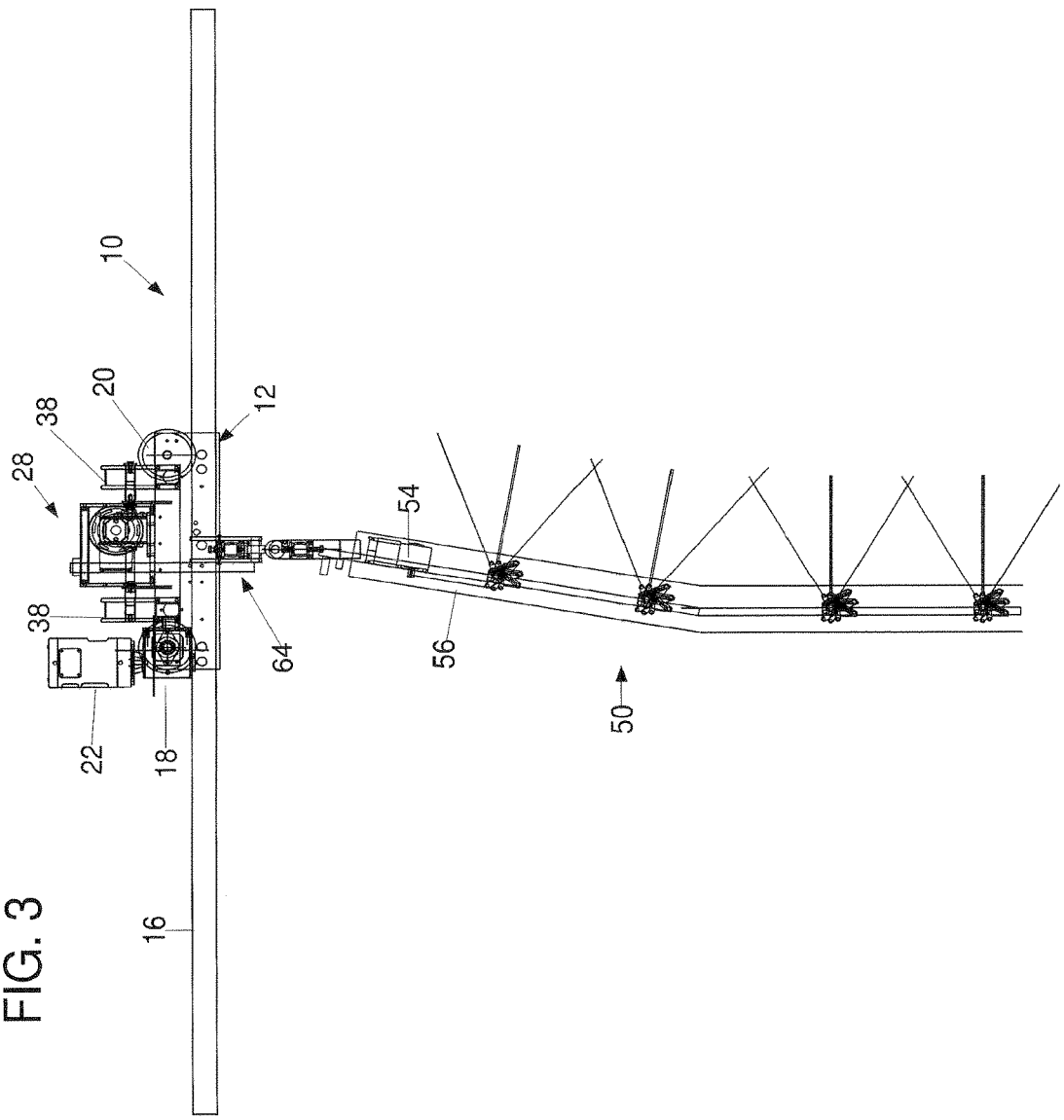
FIG. 3 is a partial end view of the wash system showing a spray arm in an inboard position.

Turning to FIGS. 19 and 20, a further example of a spray system 300 is shown. The spray system 300 may be usable in association with the trolleys in the system described in any examples shown herein, or may be useable in other systems as may be desired. Due to the small profile of the system 300, it may be used on spray arms which are operate between the front and rear of vehicles on a conveyor as describe in the system of FIGS. 1-3. The system 300 may be used on an in-bay wash system, a conveyorized wash or any other type of machine. The system 300 could also include brushes, such as rotating brushes, that could be made to contact the surfaces of a vehicle to facilitate washing thereof. The system 300 with spray nozzles may replace swivel nozzles, which are a high maintenance item, especially when reclaim water is used in the wash system. The spray system 300 may include a support shaft 302 that could be connected to the trolley assembly as previously described, to allow rotation of system 300 toward the front, sides and rear of a vehicle, or the spray system 300 may be mounted in a stationary position along a wash tunnel for example. In the example shown, the support shaft 302 may also allow forward and back movement of the frame 304 to adjust the position of frame 304 relative to a vehicle surface for example. For safety of operation, the support shaft 302 and/or frame 304 may have safety breakaway pivot points or joints 303, allowing the system 300 to "breakaway" if contacted by a vehicle or the like. The frame 304 supports a plurality of spray nozzles 310 a spaced positions to accommodate cleaning of vehicles surfaces at different heights. As previously described, if the vehicle is such that no vehicle surface is adjacent the top (or bottom) nozzle 310, the operation of any nozzle 310 may be suspended to conserve cleaning solutions, water and/or power for example. The frame structure 304 may include first and second sides 306 and 308, with one or both sides 306 and 308 forming a spray manifold through which high pressure cleaning fluids are supplied to the nozzles 310. In this example, frame member 308 if formed as a fluid supply manifold, and each of the nozzles 310 is coupled thereto via a supply fixture 312 and small length of flexible hose 314. The spray nozzles 310 may be of any desired configuration, such as spray heads with nozzles 310 that are fixed or movable (oscillating, spinning in other planes, etc). In this example, the nozzles 310 are linearly oscillating by a drive system including a gear motor 316 driving a connecting rod 320 for driving a pivoting linkage arm 322. The linkage arm 322 is also connected to a pivot support 324 on which the spray head/nozzle 310 is connected, such that movement of the crank arm 318 and linkage arm 322 causes oscillating motion of the pivot support 324 and associated spray head/nozzle 310. A second linkage arm 326 is connected to the pivot arm 322 or first spray nozzle 310, and movement thereof is translated to the second linkage arm 326 and second pivot support 324 and nozzle 310. A third linkage arm 328 is connected to the second pivot arm 322 (or second spray nozzle 310), and movement thereof is translated to the third linkage arm 328 and third pivot support 324 and nozzle 310. A fourth linkage arm 330 is connected to the third pivot arm 322 or third spray nozzle 310, and movement thereof is translated to the fourth linkage arm 330 and fourth pivot support 324 and nozzle 310. Additional or less linkage arms, pivot supports and spray nozzles may be provided. In an example, for passenger vehicles, a spray arm assembly 300 positioned 18 inches away from a vehicle, will provide full coverage of the vehicle top to bottom. The spray nozzles 310 may provide a desired spray pattern, such as a flat fan spray pattern oriented horizontally for cleaning of front, side and rear vehicle surfaces, but other spray configurations may be used.

As seen in FIG. 19, the supply of high pressure washing fluids may be provided via the manifold 308 and supply hoses 314. The hoses 314 may be coupled to the manifold by an inlet fitting 315 and to the nozzle 310 via an outlet fitting 317. The nozzle 310 in the example shown may be a spray head 324 configured as a ported block including an inlet port for coupling the supply hose 314 to via the supply fixture or fitting 312 and a nozzle at an outlet of the ported block. Other nozzle configurations may be used other than a ported block configuration as shown. For example, the nozzle could simply be a length of piping with a nozzle tip or any other suitable configuration. In any configuration, the hose 314 is formed in a loop, and supported in a bended or looped configuration as shown in FIGS. 19 and 20. In this particular example, the spray head 324 may be made to pivot through a 60-degree angle (or other desired angle), with the hose 314 looped into about a 360 degree loop. The system and methods employed in system 300 provide the most compact method of flexing a hose 314 through a significant angle. Further, the system and method provides for longest hose 314 life, as the system is operating at the minimum bend radius of the hoses 314. For example, tests of lifespan in the millions of cycles have been performed without degradation or destruction of the hose 314 or couplings/fittings to the manifold 308 and spray head 324. By "pulling" the hose 314 in an arc as shown in these FIGS., it flexes the hose 314 without kinking during oscillation and it minimizes the stress at the fittings to the manifold 308 and spray head 324. This method prevents the hose 314 from flexing more than the hose manufacturers designed minimum bend radius at any point during the oscillating motion of the spray head 324. Further, the hose 314 is self-supporting; and does not require pulleys or guides for the hose 314. The minimum size (diameter) of the hose loop may be determined by the minimum bend radius of the hose that is used. Further, although a ported block may be used for a spray head 324 as shown in this example of system 300, other spray head and nozzle configurations and conventional plumbing may be used. The arrangement of the hoses 314 in association with the oscillating nozzles 310 allow the hose configuration to always be maintained in a non-stressed position. The hose connections/fittings to the manifold 308 and nozzle 310 remain substantially unstressed during nozzle oscillation. Forming the hose 314 in a radiused configuration enables it to flex at the correct spot to accommodate oscillation without putting undue stress on the hose 314 or fittings associated therewith. The hose 314 is put under tension in it's at rest position, and upon oscillation of the nozzles 310, pulls the radius either tighter (winding of the loop) while still in tension or looser (unwinding of the loop) while still in tension, and with the fittings or couplings remaining unstressed by any bending moments. Providing the hose loops 314 such that at the maximum oscillation, the minimum recommended radius for the hose is not exceeded, keeps the hoses 314 primarily in tension rather than having any bending stresses applied thereto. Tension forces on the hoses 314 does not create any problem, while avoiding bending stresses that do cause problems, particularly at the location of fittings or couplings. Further, although the arrangement is shown for a 60 degree oscillation of spray head 324 as shown in FIG. 20, additional degrees of travel can be gained by looping the hose 314 more or less than 360 degrees.

Additionally, although the nozzles 310 can be located on the pivot centerline as shown in the drawings, they may also be offset if desired. In an example of a spray system 300 having a plurality of spray nozzles 310, it may also be desirable to counter or balance the torque generated from each oscillating nozzle 310. For example, the pivoting position of each nozzle 310 may be set off the centerline in an alternating fashion between adjacent nozzles 310 to counter the torque generated be each in an adjacent nozzle 310. This may also line up the linkage arms 322, 326, 328 and 330 in an offsetting, off centerline fashion. Alternatively, or in addition, the countering of the torque generated by each nozzle 310 can be provided by running the hose loops 314 in alternating directions, such as one counter clockwise, the next one clockwise, the next one counter clockwise and so forth. Due to the velocity of the cleaning fluids going through the hose loops 314, and oscillating motion of the nozzles, there is a tendency for the hose loops 314 to want to unwind, and alternating the direction of the loops between adjacent loops 314 counteracts the forces produced at each nozzle 310, to even out the torque along the entire system. This may allow a smaller motor 316 to be used for example.

Thus, the examples of the present invention overcome the limitations of the conventional vehicle wash systems by providing a vehicle wash system, spray systems and combinations which efficiently and effectively accommodate different vehicles and environments. The wash systems utilize two independently movable spray arm assemblies to circumscribe the vehicle quickly and efficiently with an effective but minimal use of water and chemicals, and allow more effective washing in a conveyorized system by following the movement of the vehicle while washing surfaces thereof. Another advantage of the present invention is that the spray systems allow variable washing characteristics to be achieved and improved configuration and operation of spray nozzles to minimize maintenance and degradation of the spray systems. The invention provides efficient operative control of the movement of the spray arm systems by the use of sensor systems to accurately determine the position of vehicle surfaces and placement and operation of the spray systems relative to the surfaces of the vehicle. As mentioned previously, the spray arm according to an example of the invention may be configured to "breakaway" if contacted by the vehicle or another obstacle. An example spray arm safety breakaway system 400 is shown in FIGS. 21-24. The function of the spray arm safety breakaway system 400 is to protect both the spray arm and the vehicle from damage should a collision between the two occur. The breakaway system 400 is formed of upper and lower breakaway assemblies 402 and 404, each of which may be a torque limiter arrangement, and which are fastened together with their planes of motion oriented 90 degrees to each other. The assembly 402 may have a left/right main pivot shaft 403, while the assembly 404 has a front/rear main pivot shaft 405. The assemblies 402 and 404 thus allow movement of the spray arm in both fore and aft directions as well as side to side directions. This allows breakaway in four opposing directions that would accommodate any force applied to the spray arm. Generally, breakaway systems used in the car wash industry use either shear pins or ball & detent type of mechanisms. The ball and detent type systems have the advantage of being easily resettable but do not easily handle larger torque loads. Due to the propulsive force of the water leaving the spray bar, the torque load induced at the breakaway can easily exceed 200 ft-lbs. This translates into many thousands of pounds of pressure on the ball and it's mating surface in a typical ball and detent configuration. At these high loads, when the breakaway is activated, the forces on the ball & the mating surface (ball & detent mechanism) can exceed the strength of the material and cause the ball to extrude the metal on the mating surface and literally form a grove in the material. Repeated cycling causes a very high rate of wear & progressive reduction in breakaway force. Attempts to alleviate this problem, such as by extreme surface hardening of the metals to prevent this, will cause the metal to become excessively brittle and prone to cracking and failure. Also, in a car wash environment, stainless steel is preferred over high carbon steel materials, and stainless steel does not surface harden as well as high carbon steel.

In the breakaway design as shown in the example of the present invention, the upper system 402 is attached to a main support shaft 406 which may be fixed to the trolley as previously described, and provided for breakaway in the side to side or lateral directions. The lower assembly 404 is mounted below upper assembly 402, and allows for breakaway in the fore to aft directions. Distinct from shear pin type of designs, the breakaway mechanism 402 and 404 also automatically reset as soon as outside forces are removed, as the spray bar is allowed to hang freely from the trolley assembly and returns each assembly 402 and 404 to an unactuated position upon any force being relieved. In each assembly 402 and 404, an elastomer spring 408 provides a preload force which can be adjusted by an adjustment bolt 410. Other suitable preload mechanisms may be used as desired. The assemblies 402 and 404 use a rolling pin 412 and 414 instead of a ball, with pin 412 mated and engaged in a groove, such as a V-groove 416 (as seen in FIG. 21) and pin 414 mated and engaged in a groove, such as a V-groove 418 (as seen in FIGS. 23 and 24). In each assembly 402 and 404, the pin 412 or 414 has a line of contact with its mating surface rather than a single point of contact. This much larger contact area spreads the forces out and eliminates the possible galling and grooving of the metal that occurs with the known ball and detent type of mechanisms. In each assembly 402 and 404, the mechanism also incorporates a lever arm 420 mounted on a pivot pin 422 to support the rolling pin 412 and 414.

In the lower assembly 404, the groove 418 may be formed as an asymmetrical V-groove mating surface for the pin 414, to provide more resistance to the backward movement of the spray arm to resist the strong forces imposed during spraying. It should be recognized that the use of different angles on the groove 416 results in different breakaway forces depending on which direction the breakaway is rotated. Further, the orientation of the lever arm pivot point, toward the steep angle side or toward the shallow angle side of the mechanism, also changes the breakaway forces. In the example shown, the asymmetrical V-groove 418 uses a 30 degree angle (from vertical) on one side and a 45 degree angle on the other side, but other angles may be used. To simplify manufacture, the upper mechanism 402 may also use an asymmetrical groove 416, but the groove is oriented differently. When the pivot pin 412 or 414 is located toward the shallow angle side of the groove 416 or 418, the mechanism provides virtually identical breakaway forces in both directions, which may be desirable for the upper mechanism 402 to provide left/right breakaway of the spray bar. When the pivot pin is located toward the steep angle side of the mechanism, the result is a breakaway force that is strong in one direction and weak in the opposite direction, which may be desirable for the lower mechanism 404 to provide distinct forces for the front and back movement of the spray bar. This arrangement can be used to keep all breakaway forces low except in the one direction required to oppose the force of the water jets of the spray nozzles.

In the example shown, the reason the orientation of the lever arm affects the breakaway force is described as follows. As rotation begins due to a force being applied to the spray arm to cause actuation of the breakaway, the rolling pin 412 or 414 moves up out of the groove 416 or 418, as it does, the lever arm 420 rotates about pivot pin 422. The rotation of the lever arm 420 effectively changes the contact angle and therefore the leverage or resistance to torque that is applied by the force of the spring 408.

Figure 25:
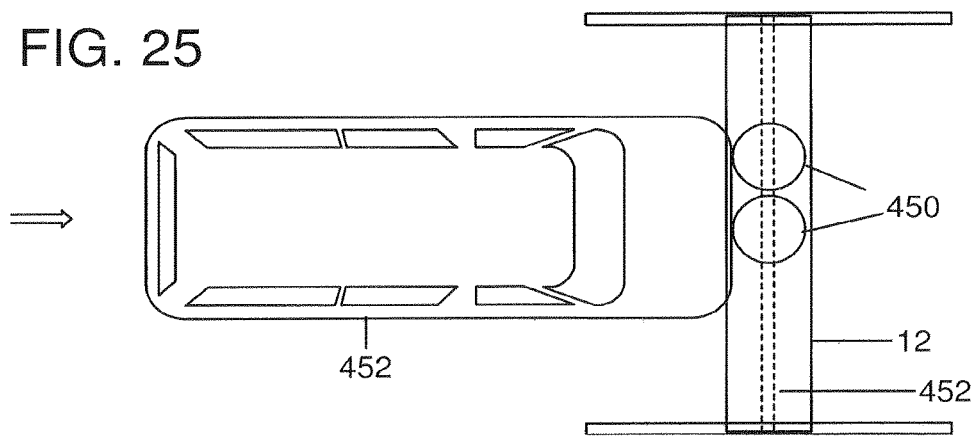
FIG. 25 shows a schematic example of brush assemblies for use in the system.
Figure 26:
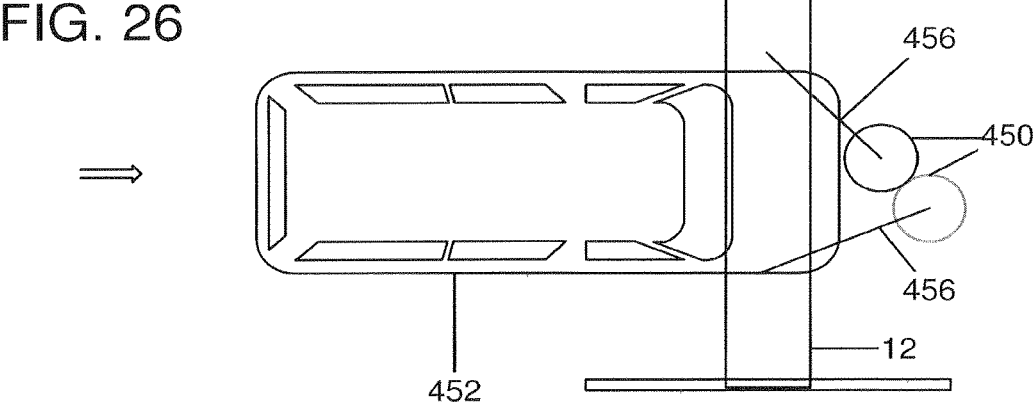
FIG. 26 shows another schematic example of brush assemblies for use in the system.
Figure 27:
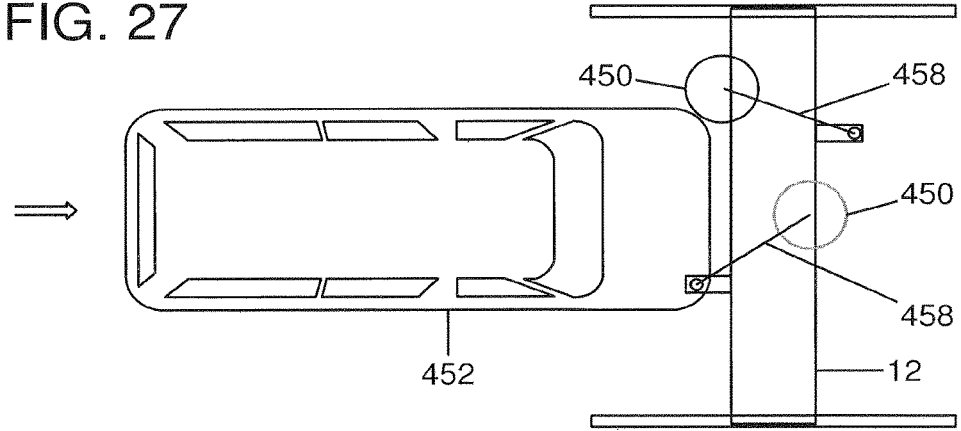
FIG. 27 shows another schematic example of brush assemblies for use in the system.

Turning to FIGS. 25-27, there are shown various examples of brush assemblies that may be usable in the wash system, either alone or in conjunction with other aspects of the invention such as the spray bars described above. In FIG. 25, the example shows a brush type assembly 450 may be used in association with the at least one cleaning arm provided with the wash system. The brush assembly 450 may be a cloth or foam brush for example, and could be made to rotate or otherwise provide washing action on the surfaces of the vehicle 452 to be washed. The brush assembly 450 in this example is provided to move on linear rails 454 associated with the bridge assembly 12, or in association with the cleaning arm associated with each trolley assembly as previously described. The brush assembly 450 is moved from the home position shown in FIG. 25 in a manner similar to the spray arms as previously described, to clean the front, sides and rear of vehicle 452, as the bridge 12 moves relative to the vehicle 452. The operation of the brush assemblies 450 may be controlled by a tunnel controller according to the known position and movement of the vehicle 452 on the conveyor, or could be operated based on sensor signals as described in prior examples. In the example of FIG. 26, the at least one brush assembly 450 is mounted on an overhead pivoting support arm 456. As the vehicle 452 moves through the wash system or is positioned in the system, the brush assemblies 450 may be moved between the front, sides and rear of the vehicle 452. The pivoting support arms 456 allow the movement of the vehicle 452 to deflect the brushes as it moves through the wash system, or as the bridge assembly 12 moves around the vehicle. In FIG. 27, this example also shows brush assemblies mounted in association with pivoting support arms 458, the position the brush assembly 450 inboard or outboard of the bridge 12 as seen in the Figure. In these or other examples, the brush assemblies may be brought into selective contact with the vehicle 452 to facilitate washing the surfaces thereof. Similar to the prior examples of spray arms, the brush system could also include an upper brush assembly to wash the top surfaces of the vehicle 452 if desired. Additional spray arms, rinse systems and the like may also be provided to facilitate washing in association with the at least one brush assembly.

Figure 28:
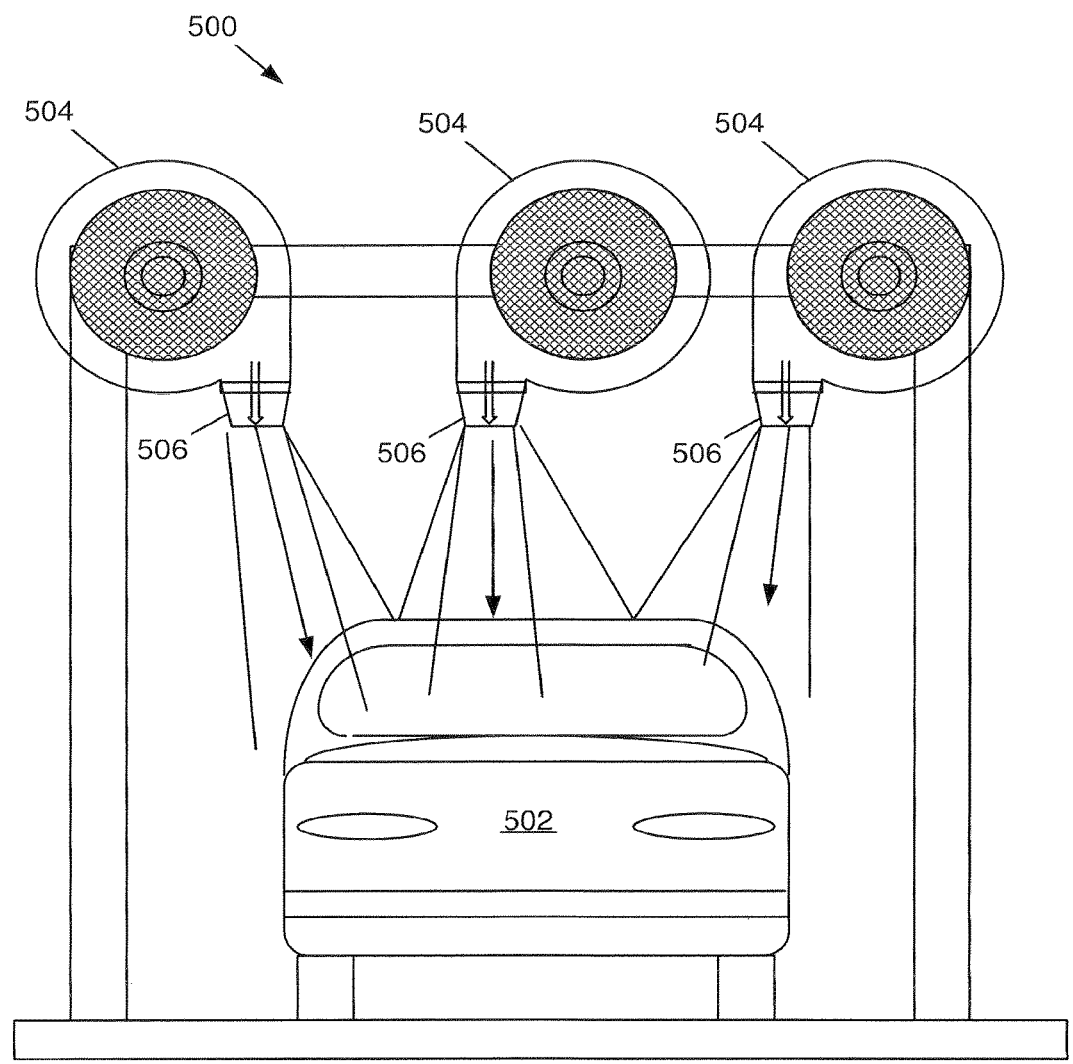
FIG. 28 shows an example of a drying system according to the invention.

Turning to FIG. 28, there is shown a drying system for use in association with a washing system for example, wherein the drying system is generally designated 500. In this example, the drying system 500 may be positioned for movement in conjunction with the washing system as previously described in examples, and may be mounted in a stationary position with respect to the washing system. Alternatively, the drying system 500 could be separate from any washing system, such as at the end of a tunnel conveyor associated with a wash system, or other suitable location. The drying system 500 is designed to effectively dry or dissipate water from a vehicle 502. The system 500 operates in a manner to effectively dry vehicles 502 of different heights and/or widths. Though an example is shown in the FIG. 28 which includes a plurality of drying units 504, one or more units may be used as desired. The type of drying unit can also vary significantly as may be desired, and units 504 as shown are only examples. Such a dryer system 500 configuration could also be positioned more directly adjacent the side or other surfaces of the vehicle if desired. Although it may be possible to adjust the position of the drying units 504 and provide effective drying for different vehicle surfaces, such an approach requires a more complicated and costly system. Regarding the air dispensed under pressure by the units 504, the impact or force of the drying air impacting on a surface of vehicle 502 drops significantly (generally exponentially) as the distance from the surface (vehicle 502) increases. This applies to all types of nozzles including fan, cone and other configurations in general. Controlling the force at the surface (not too little or too much) is desired for proper and safe drying of all types of vehicles and surfaces, similar to the operation of the spray system as described in the example of FIGS. 16-18. The use of movable dryers to keep them at a fixed or generally consistent distance from the vehicle can cause problems including higher cost, higher maintenance, increased complexity, and possibility of impacting the vehicle with the moving equipment. Also, any time that drying units 504 are placed in the path of the vehicle, customer driving errors and addition of equipment such as bike racks can create unintended impacts. The drying system 500 can be used to eliminate the need to move the drying units 504 nozzles toward or around vehicles or they can be used to enhance the impact and angle of drying air for more effective drying.

In the example, the operation of system 500 is altered to account for different height vehicles 502 instead (or with respect to other vehicle surfaces, by providing variable impact and air pattern geometry configurations. In a first aspect, the system 500 can vary the force of the air directly proportional to the distance the dryer nozzle(s) 506 are from the surface of the vehicle. Sensors may be used to determine the distance a nozzles 506 are from the vehicle surface and then the force of the drying air can be adjusted using any of several approaches. Examples include varying the pump speed (which varies the volume), varying the pressure with a pressure regulator or other valving, or by varying the nozzle geometry or orifice size for example. It is noted that both the measurements and corresponding force adjustments can be made in steps or be infinitely variable. This can be applied to devices with nozzles that are fixed or movable (oscillating, etc). Movable nozzles could be made to oscillate or move linearly along a slide or the like if desired, or may just be fixed, and may be provided with an adjustable air dispensing pattern if desired. In an example, the method of sensing the distance to the vehicle may depend on the particular application. Generally, the method may use an ultrasonic sensor positioned substantially perpendicular to the surface or a plurality of thru-beam photo-eye pairs substantially parallel to the surface. The step of adjusting the power of the dispensed drying air may use a variable speed control on the motor associated with units 504, or other suitable approaches can be used. In a second aspect of an example, the system 500 could use nozzles 506 that are made to oscillate, or otherwise move through a given path. In this case, the movement of the nozzles 506 can be varied inversely proportional to the distance the nozzle 506 is away from the vehicle. If the distance from the nozzle 506 increases, then the path that the nozzle may be made to move would also increase, and the speed at which the nozzle traverses the surface is also increased, such that the entire surface to be dried is covered. The system may thus be operated to control the distance that the drying air travels across the surface of the vehicle, as well as the speed at which the drying air travels across it, to provide effective drying. If there is a plurality of nozzles 506 drying the vehicle, this feature can control the size or area of coverage of each nozzle 506 to achieve the desired coverage overlap from nozzle to nozzle.

In the example, a system 500 could thus use one or both of variable geometry (travel) and variable volume/pressure provide the ability to effectively control the drying characteristics of the system 500 relative to a particular vehicle 502. The system 500 keeps the force characteristics the same despite changes in distance, without having to move the system 500 closer to or away from the vehicle 502. In an example, the distance from the system 500 to the vehicle 502 may be used to adjust the angle and/or pressure of the dispensed drying air from one or more units 504. Additionally or optionally, the length or position of the surface being dried may be also be sensed and used to vary the angle of dispensed air and/or the patterns. For example, the pattern of dispensed air could be adjusted if the vehicle is detected to be offset relative to the system 500, or if it is wider or narrower. As with the washing spray systems described previously, different height vehicles 502 may be effectively dried by system 500. The variable pressure and/or dispensing air angles produced provide effective drying of surfaces depending on the position of the surface relative to the nozzles 506.

Turning to FIGS. 29-35, a multidirectional nozzle assembly 600 according to an example may comprise a ducted block 602 having a nozzle 604, rotatably connected to a pivot 606 adjacent a conduit 608. The conduit 608 may be a pipe, a tube, hose or other conduit in communication with a source of fluid, such as but not limited to a hose connected to a source of cleaning fluid. The pivot 606 may comprise a pin 610 fixedly attached adjacent to the conduit 608. An actuator 612 pivotably connected to the block 602 offset from the pivot 606 is capable of cyclically rotating the block 602 about the pivot 606 through a pre-determined angle. A flexible second conduit, such as a flexible hose 614 connects the conduit 608 with the block 602. The flexible hose 614 extends in an arcuate path around the pivot 606.

In operation, the actuator 612 causes the block 602 to cyclically rotate around the pivot 606 between a first position and a second position separated by a pre-determined angle. In this way, fluid may spray from the nozzle 604 in a cyclical up-and-down spray motion, or a side-to-side spray motion, or other predetermined spray path. In the nozzle assembly shown in FIG. 29, the block 602 and nozzle 604 rotate through a 60 degree angle, a 30 degree angle, or other angle as desired.

Further, in operation the nozzle assembly may be positioned within a wash system, such as but not limited to a car wash. One skilled in the art may determine a desired spray path and direction by considering the location of the nozzle within the wash system, the article that will be sprayed within the wash system, the fluids that may be sprayed through the nozzle, and other factors related to the design and requirements of the wash system.

The ducted block 602 may comprise an inlet 616, an outlet 618, and a passageway therebetween. The nozzle 604 is connected to the outlet 618. The nozzle 604 may be positioned on the block 602 such that the fluid spraying from the nozzle is directed in a desired direction. The nozzle 604 may be offset from the pivot centerline as shown in these Figs. Alternately, the nozzle 604 may be located on the pivot centerline.

Figure 33:
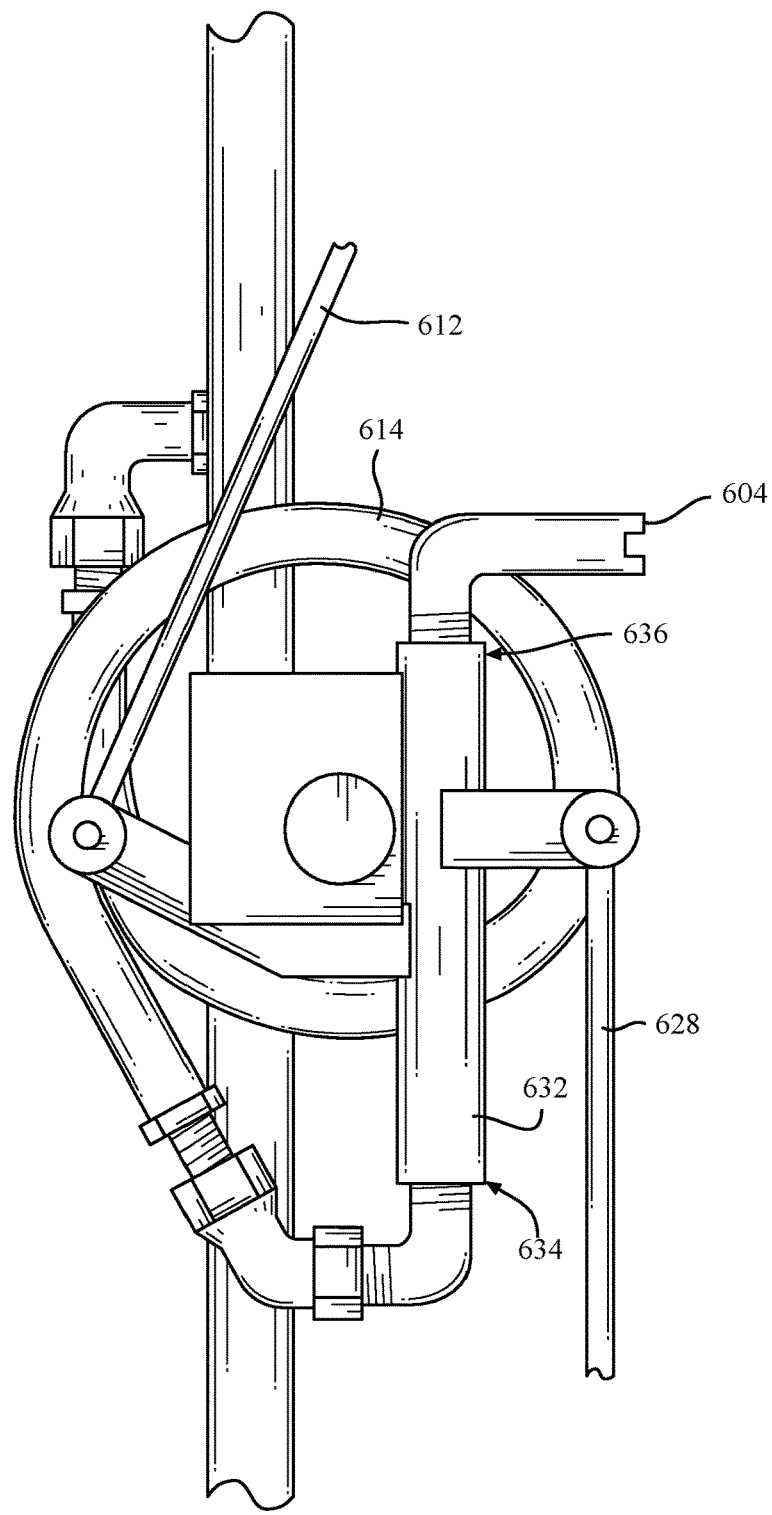
FIG. 33 is an alternate embodiment of a multidirectional nozzle assembly.

The block 602 may be a pipe 632 as shown in FIG. 33. In the embodiment of FIG. 33, the pipe 632 may be straight or may have one or more bends to position an inlet 634 and outlet 636 in desired orientations.

Figure 29:
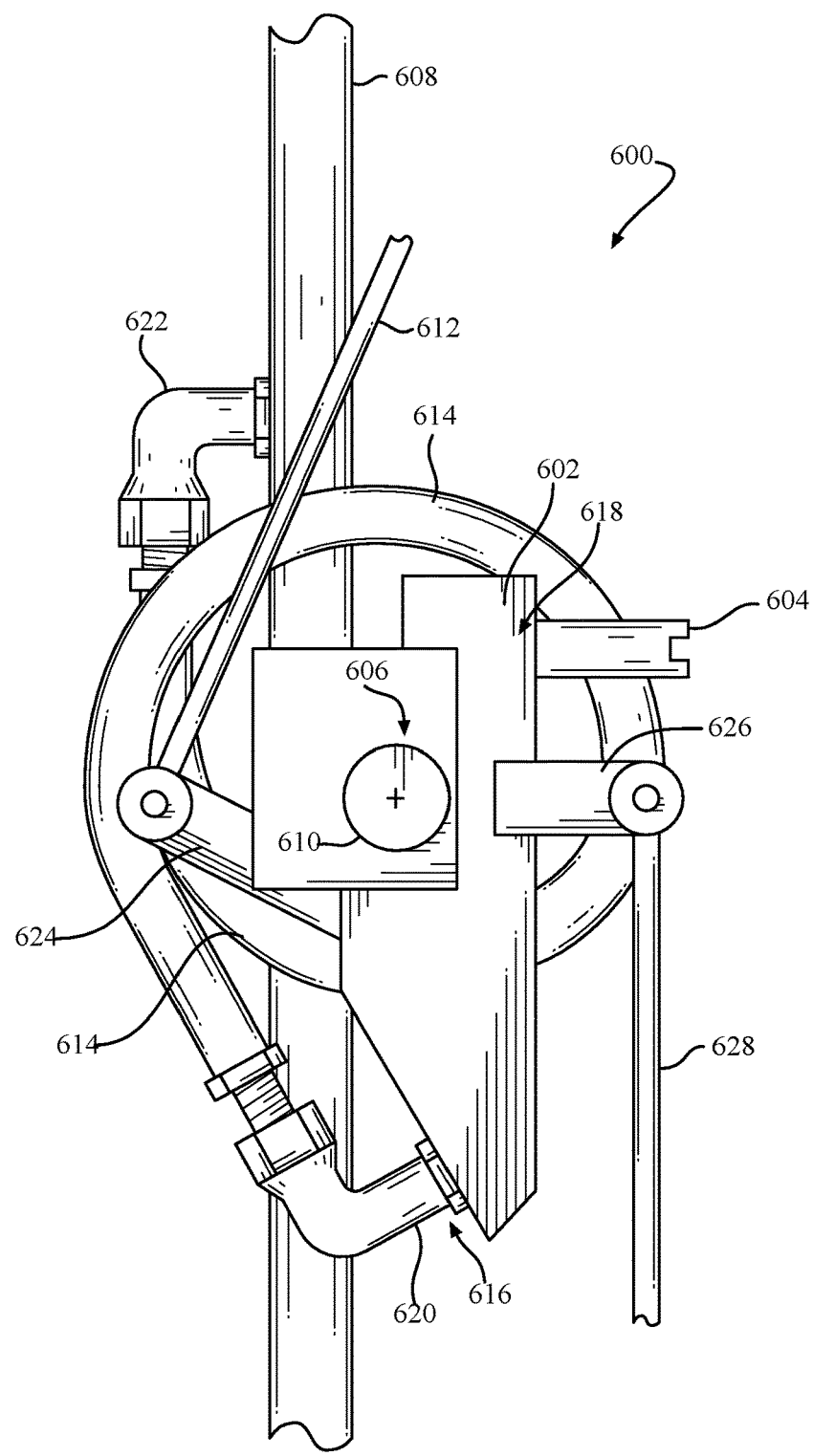
FIG. 29 is a front view of a multidirectional nozzle assembly according to the invention.
Figure 30:
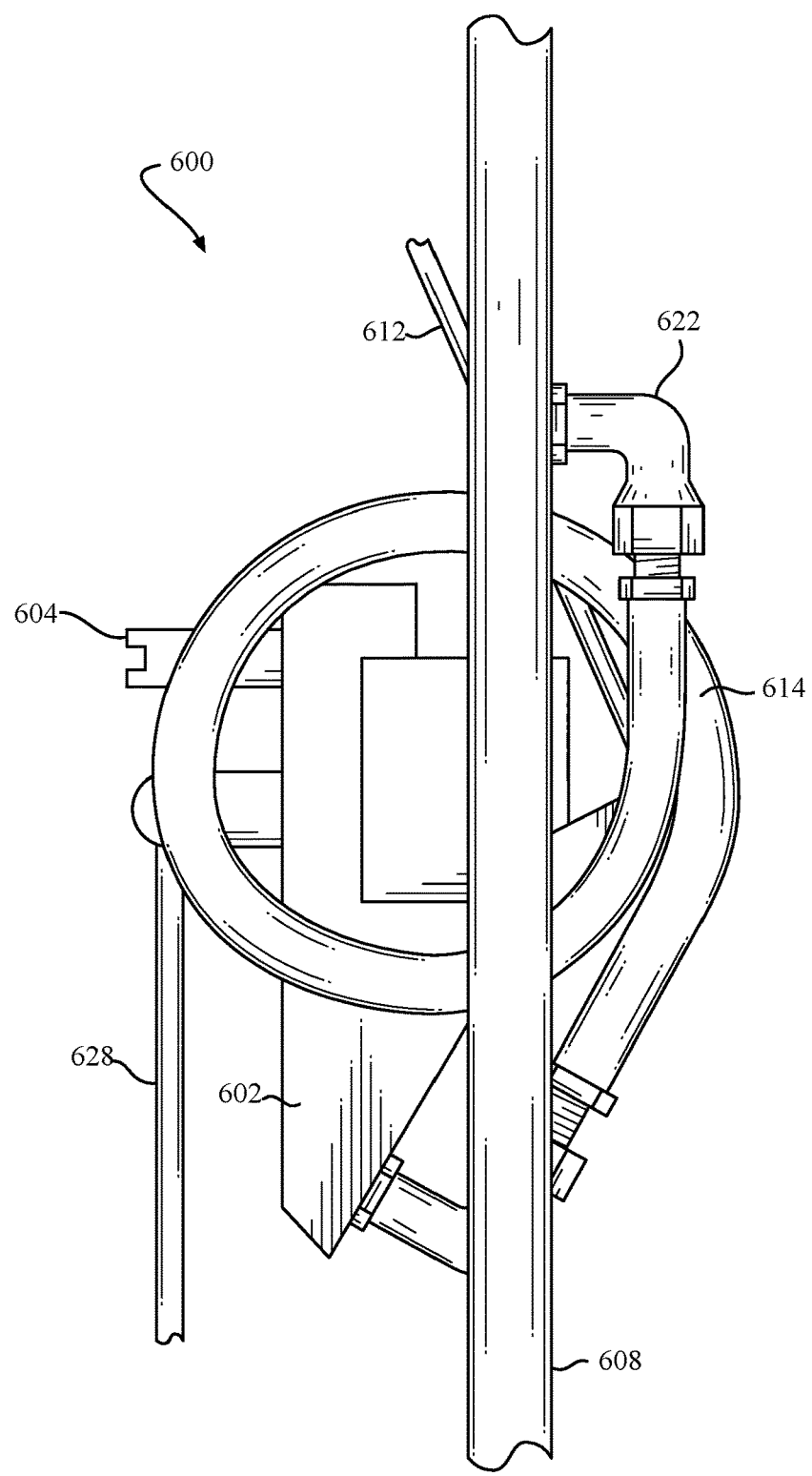
FIG. 30 is a rear view of the multidirectional nozzle assembly of FIG. 29.
Figure 31:
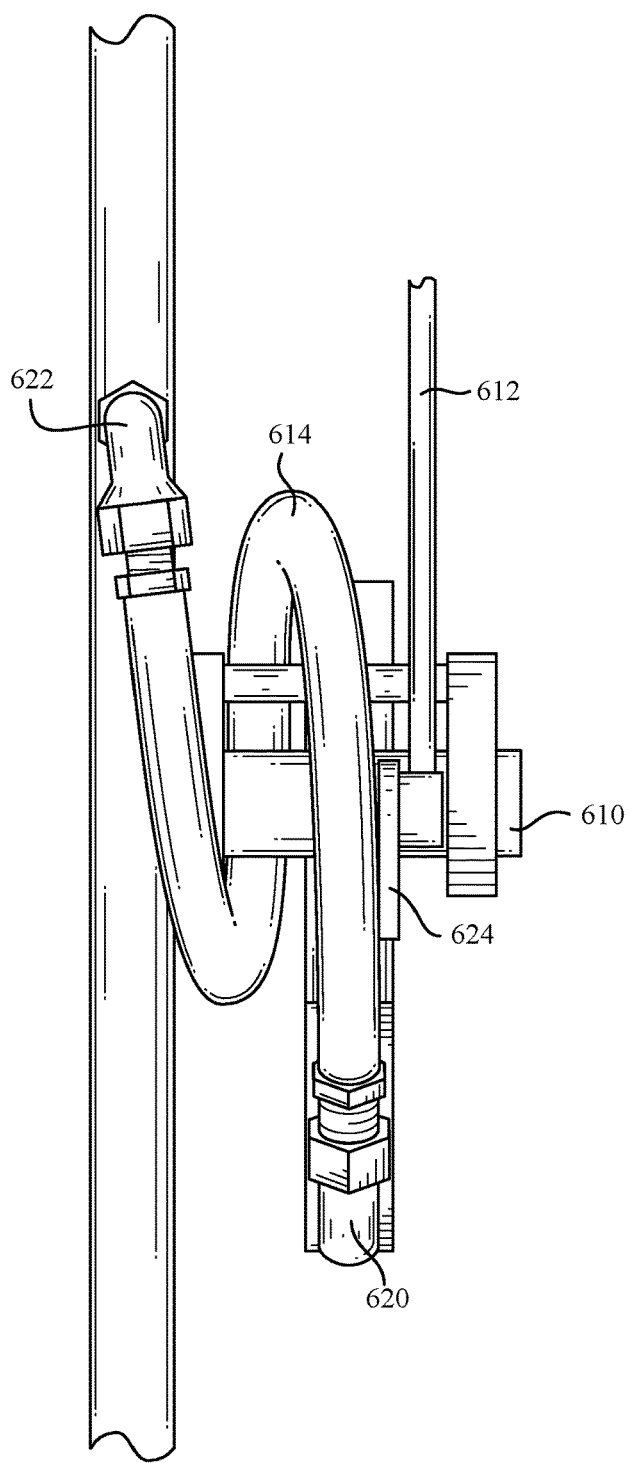
FIG. 31 is a side view of the multidirectional nozzle assembly of FIG. 29.

The flexible hose 614 connects the conduit 608 with the block inlet 616 and is positioned in an arcuate path. As shown in FIG. 29 through 31, the flexible hose 614 may be positioned in an arcuate path around the pivot 606. Alternately, flexible hose 614 may be positioned in an arcuate path adjacent the pivot 606 (not shown). An outlet port or coupler 620 may be positioned between the block 602 and the hose 614, and an inlet port or second coupler 622 may be positioned between the hose and the supply conduit 608. The outlet port 620 between the block and hose may be a 90 degree elbow fitting, a 45 degree elbow fitting, a straight fitting, or any other shape or type of coupler capable of connecting the hose 614 to the spray nozzle or block inlet 616 and positioning the hose in a desired orientation. The inlet port or second coupler 622 between the hose 614 and conduit 608 may be a 90 degree elbow fitting, a 45 degree elbow fitting, a straight fitting, or any other shape or type of coupler capable of connecting the hose 614 to the conduit 608. The inlet port 622 may be connected through an aperture through a wall of the conduit 608 as shown in this example. Alternately, the inlet port 622 may be connected to an end of the conduit 608.

The hose 614 may be positioned in a coil extending more than about 360 degrees around the pivot, as shown in FIG. 29. When the block 602 cyclically rotates around the pivot 606 in operation, the coil of the hose 614 increases and decreases in diameter, reducing the amount of flexing of the hose. The coiled shape reduces the stress on the hose 614 and the ports or couplers 620, 622 by reducing the amount of flexing of the hose as the nozzle moves between the first position and the second position. The diameter of the coiled shape may be any desired diameter that enables the nozzle to move between the first position and the second position.

Figure 34:
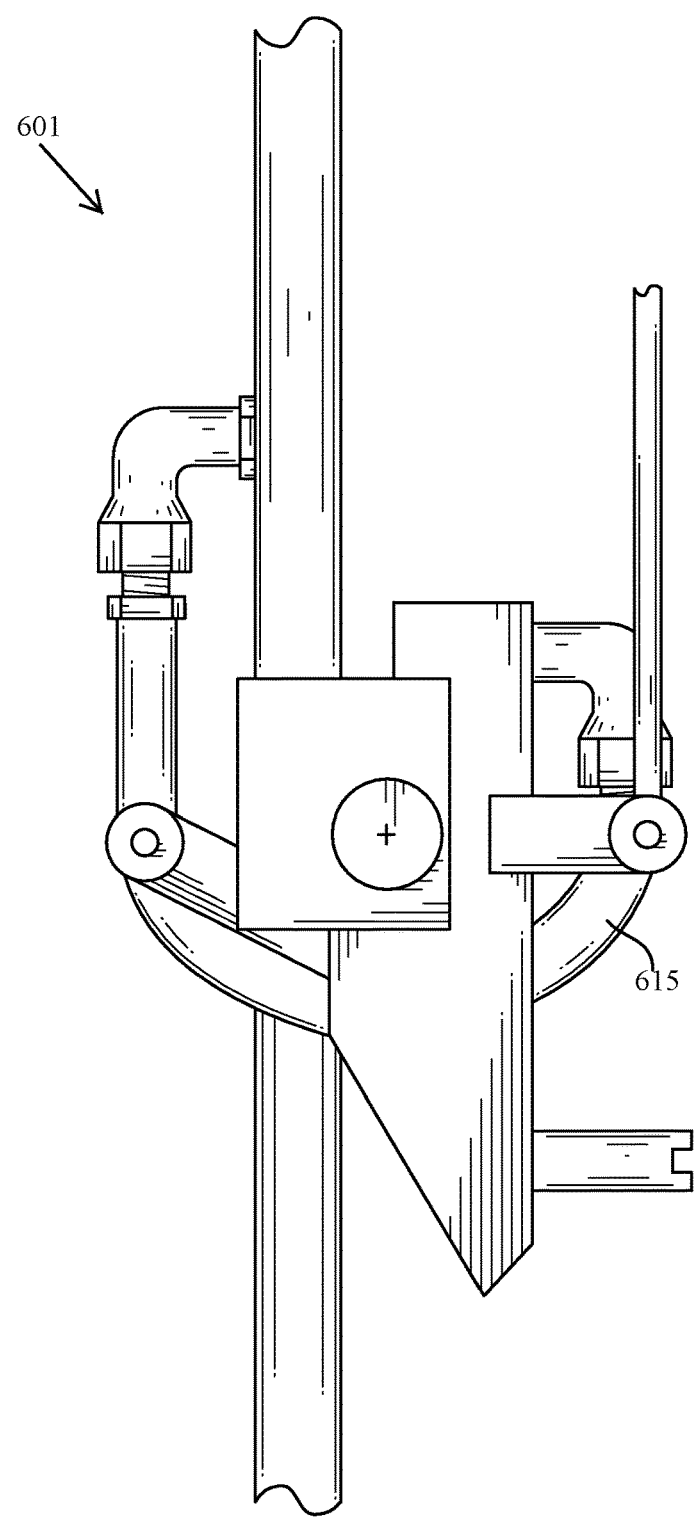
FIG. 34 is another alternate embodiment of a multidirectional nozzle assembly.

Alternately, the hose 614 may be positioned around the pivot 606 in an arcuate shape extending less than about 360 degrees, such as but not limited to about 270 degrees around the pivot, or about 180 degrees around the pivot as shown in FIG. 34.

There may also be provided a first lever 624 and a second lever 626. The actuator 612 may be pivotably connected to the first lever 624 or the second lever 626 as desired. The first lever 624 and second lever 626 may be fastened to the nozzle, such as but not limited to welding, adhesives, one or more fasteners, clamps, or any other techniques for attaching the levers to the block. Alternately, the first lever 624 and second lever 626 may be formed integral with the block, such as but not limited to a casting, or molded part. As shown in FIG. 29, the actuator 612 may be pivotably connected to the first lever 624 and offset from the pivot 606.

Figure 32:
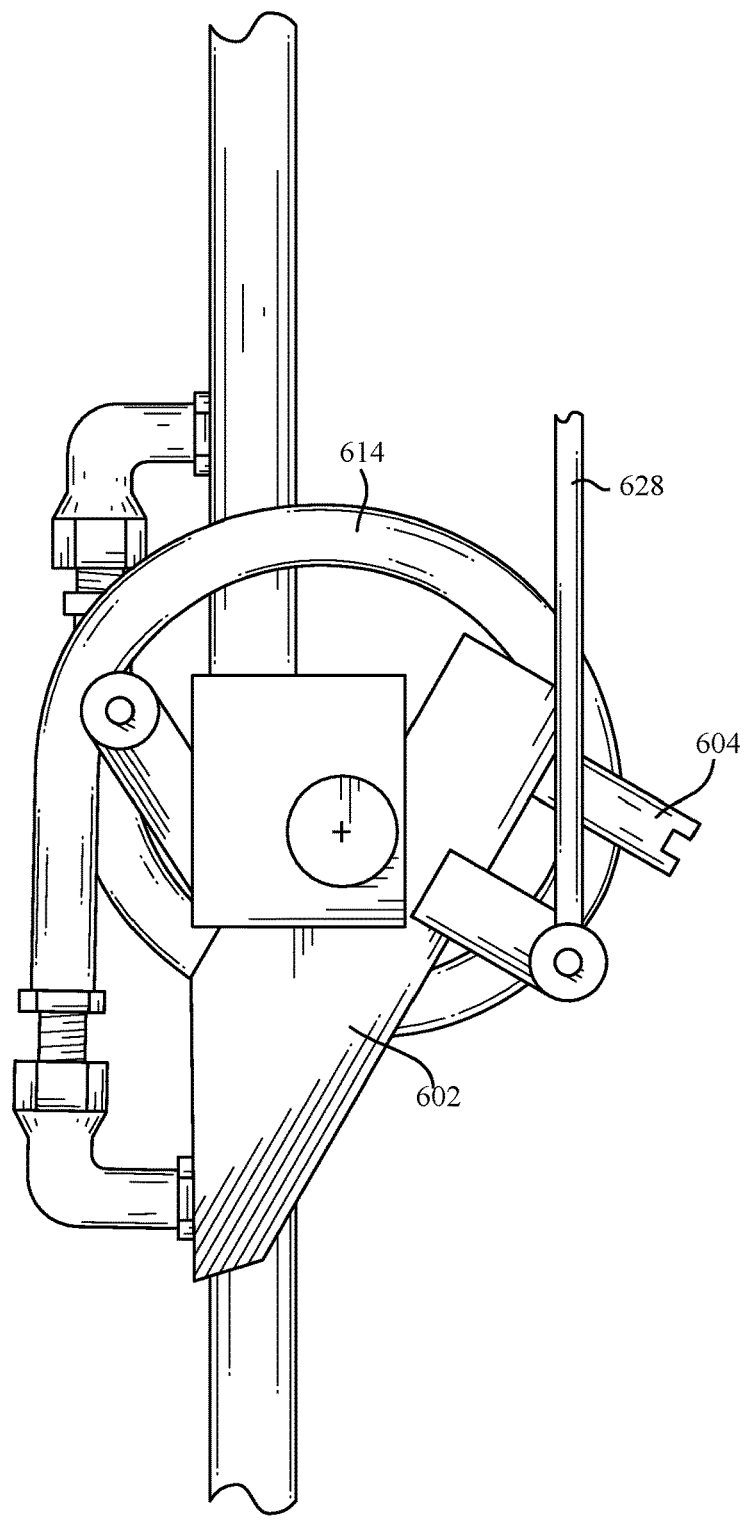
FIG. 32 is the multidirectional nozzle assembly of FIG. 29 in a second position.

The actuator 612 may be a hydraulic or pneumatic cylinder, a linkage operatively connected with a motor, or any other mechanism capable of providing a translational or rotational motion for rotating the spray nozzle such as block 602 around the pivot 606 between a first position, such as shown in FIG. 29, and a second position, such as shown in FIG. 32.

The first position and the second position may be positioned about 60 degrees apart around the pivot. Alternately, the distance between the first position and the second position may be in a range between about 30 and 60 degrees.

Alternately, the first and second positions may be between about 15 and 90 degrees apart. The distance between the first and second positions may be controlled by the movement of the actuator 612.

The controller, such as but not limited to a computer or programmable logic controller, may be programmed to enable the actuator 612 to rotate the nozzle, such as block 602, in a cyclical motion alternating between the first position and second position. Alternately or in addition, the motion between the first position and second position may include a time delay in the first position, the second position, in another position, or a combination thereof. Alternately, the motion in operation may be continuous.

Figure 35:
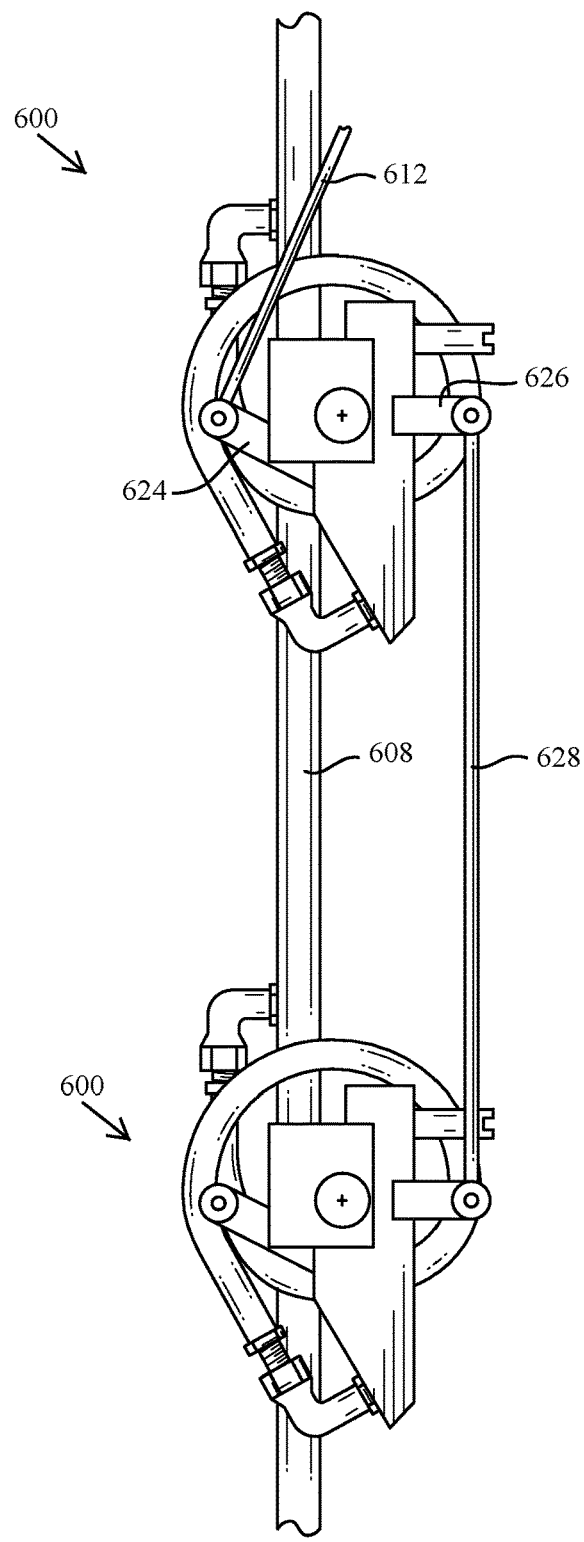
FIG. 35 is a front view of a wash system using multidirectional nozzle assemblies.

More than one nozzle assembly 600 may be used together in a wash system. As shown in FIG. 35, two or more nozzle assemblies 600 may be provided in association with the same cleaning fluid source such as conduit 608. A first nozzle assembly 600 may be attached to the conduit 608 in a desired location and a second or additional nozzle assemblies 600 are positioned along a vertical orientation or any other orientation as desired, to provide spray coverage over a height to suit different vehicles. A linkage 628 may be pivotably connecting the first block 602 offset from the first pivot 606 to the second block 602 offset from the second pivot 606 and enabling the first block 602 and second block 602 to cooperate. The linkage 628 may be provided between the second lever 626 of the first nozzle assembly 600 and the second lever 626 of the second nozzle assembly 600. The actuator 612 may be connected to the first lever 624 of one of the nozzle assemblies to drive the motion of one nozzle, where the linkage 628 enables the nozzle assemblies to move together.

As shown in FIG. 35, the linkage 628 may be a one-piece linkage. Alternately, the linkage 628 may comprise two or more links forming a mechanism for controlling the motion of the second nozzle assembly (not shown). A multi-piece linkage 628 may be provided to enable the motion of the second nozzle to have a greater or lesser spray angle, or have a spray direction or orientation different from that of the first nozzle assembly, or introduce varying time delays in the rotation of the second nozzle assembly.

As described above, a plurality of nozzle assemblies may be provided in a wash system, and may be arranged along the conduit 608 in any desired spacing. Each nozzle assembly 600 may provide the same spray angle, and may be oriented in the same direction. Alternately, at least one nozzle assembly may provide a spray angle and direction different from at least one other nozzle assembly. The conduit 608 may be positioned along any desired direction within a wash system. The conduit 608 may be positioned in a vertical, horizontal, lateral, transverse, angled, arcuate, skewed, or any other orientation as desired to accommodate and position one or more nozzle assemblies within the wash system.

While the invention has been illustrated and described in detail in the foregoing drawings and description, the same is to be considered as illustrative and not restrictive in character, it being understood that only illustrative examples thereof have been shown and described, and that all changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. A spray system comprising at least one spray nozzle mounted to oscillate between first and second positions about a pivot, the at least one spray nozzle coupled to a source of a fluid by a hose member, wherein the hose member is formed in an arcuate path around the axis of the pivot between inlet and outlet fittings, wherein the at least one spray nozzle is cyclically rotated about the pivot through a pre-determined arc in the direction of the arcuate path.

2. A spray system as set forth in claim 1, wherein the predetermined arc is variable.

3. A spray system as set forth in claim 1, wherein the arcuate path is between 180 and about 360 degrees.

4. A spray system as set forth in claim 1, wherein the pivot comprises a pin member on which the at least one spray nozzle is mounted.

5. A spray system as set forth in claim 1, wherein the at least one spray nozzle is mounted and oscillated at a location along or offset from the pivot centerline.

6. A spray system as set forth in claim 1, wherein the at least one spray nozzle is mounted in association with a fluid conduit that supplies fluid to the hose member.

7. A spray system as set forth in claim 1, wherein the at least one spray nozzle is mounted in association with a fluid conduit that supplies fluid to the hose member and the hose member is coupled to the fluid conduit by an inlet fitting and to the at least one spray nozzle by an outlet fitting.

8. A spray system as set forth in claim 1, wherein the oscillation of the at least one spray nozzle causes winding and unwinding of the arcuate path around the pivot.

9. A spray system as set forth in claim 1, wherein the hose member is self-supporting between the inlet and outlet fittings.

10. A spray system as set forth in claim 1, wherein the hose member is put under tension in a rest position, and upon oscillation of the at least one spray nozzle through the pre-determined arc, winds and unwinds the arcuate path while the hose member is still in tension.

11. A spray system as set forth in claim 1, further comprising an actuator that provides rotational motion to the at least one spray nozzle.

12. A spray system as set forth in claim 1, wherein the motion between the first position and second position is selected from the group consisting of a time delay in the first position, a time delay in the second position, a time delay in another position between the first and second position, continuous or a combination thereof.

13. A spray system as set forth in claim 1, further comprising a plurality of spray nozzles arranged in relation to one another.

14. A spray system as set forth in claim 13, wherein the pivoting position of each spray nozzle is set in offsetting relationship between adjacent spray nozzles.

15. A spray system as set forth in claim 13, wherein at least one spray nozzle provides a spray angle or direction different from at least one other spray nozzle.

16. A spray system as set forth in claim 1, wherein upon oscillation of the at least one spray nozzle, the hose member flexes without exceeding the minimum bend radius of the hose member.

17. A spray system as set forth in claim 1, wherein the pivot is associated with a conduit supplying fluid to the at least one spray nozzle.

18. A spray system comprising a plurality of spray nozzles mounted to oscillate between first and second positions about a pivot, each spray nozzle coupled to a source of fluid by a hose member, wherein the hose member is formed in an arcuate path around the pivot axis, and an actuator for moving each of the spray nozzles rotationally between the first and second positions.

19. A spray system as set forth in claim 18, wherein the plurality of spray nozzles are mounted in association with a fluid conduit, and the pivot is a pin extending from the conduit, and wherein the arcuate path is formed around or adjacent to the pivot pin.

20. A spray system as set forth in claim 18, wherein the arcuate path of each hose member is formed around or adjacent to the pivot and wherein the oscillation of the at least one spray nozzle causes winding and unwinding of the arcuate path about the pivot.

\* \* \* \* \*